US012591870B2

(12) United States Patent
Iliev et al.

(10) Patent No.: US 12,591,870 B2
(45) Date of Patent: Mar. 31, 2026

(54) SECURE PROCESSING OF CENTRAL BANK DIGITAL CURRENCY (CBDC) CARD PAYMENTS

(71) Applicant: R3 Ltd., London (GB)

(72) Inventors: Stefan Iliev, Sofia (BG); Sotiria Fytraki, London (GB); Bogdan Catalin Paunescu, London (GB); Richard G. Brown, London (GB)

(73) Assignee: The Central Bank of the United Arab Emirates, Abu Dhabi (AE)

( * ) Notice: Subject to any disclaimer, the term of this patent is extended or adjusted under 35 U.S.C. 154(b) by 146 days.

(21) Appl. No.: 18/347,513

(22) Filed: Jul. 5, 2023

(65) Prior Publication Data

US 2024/0242188 A1 Jul. 18, 2024

Related U.S. Application Data

(60) Provisional application No. 63/439,055, filed on Jan. 13, 2023.

(51) Int. Cl.
G06Q 20/10 (2012.01)
G06Q 20/38 (2012.01)
G06Q 20/40 (2012.01)

(52) U.S. Cl.
CPC ......... G06Q 20/108 (2013.01); G06Q 20/105 (2013.01); G06Q 20/3825 (2013.01); (Continued)

(58) Field of Classification Search
CPC ............... G06Q 20/108; G06Q 20/105; G06Q 20/3825; G06Q 20/3827; G06Q 20/3829; G06Q 20/4014; G06Q 2220/00
See application file for complete search history.

(56) References Cited

U.S. PATENT DOCUMENTS 5,677,955 A * 10/1997 Doggett ............... G06Q 20/367
380/30
11,315,113 B1 * 4/2022 Kurennykh .......... G06Q 20/204
(Continued)

OTHER PUBLICATIONS

Geoffrey Goodell, et al., The Development of Central Bank Digital Currency in China: An Analysis, Aug. 12, 2021, arXiv.org, pp. 1-14 (Year: 2021).*

(Continued)

*Primary Examiner* — Nilesh B Khatri
(74) *Attorney, Agent, or Firm* — Perkins Coie LLP; Sumedha Ahuja; Anna Onley

(57) ABSTRACT

Central bank digital currency (CBDC) tokens are used for payment in a transaction initiated by a payment card at an acquirer's point-of-sale. To facilitate these transactions, a card issuer node in a distributed ledger environment receives a payment message from a payment terminal. The payment message, comprising a request to conduct a CBDC-based transaction, contains a signature transmitted to the payment terminal by a payment card. The card issuer node generates a signature data structure that contains the signature. The card issuer node also generates a transaction message containing components of the transaction, such as a number of tokens to be transferred, a current owner of the tokens to be transferred, an intended acquirer of the tokens, a currency type of the tokens, and/or instructions for validating the transaction. The transaction is validated based at least in part on the signature data structure in the transaction message.

20 Claims, 19 Drawing Sheets

(52) U.S. Cl.
CPC ..... *G06Q 20/3827* (2013.01); *G06Q 20/3829* (2013.01); *G06Q 20/4014* (2013.01); *G06Q 2220/00* (2013.01)

(56) References Cited

U.S. PATENT DOCUMENTS

| | | | | |
|---|---|---|---|---|
| RE49,968 E * | 5/2024 | Ebrahimi | .............. | H04L 9/3247 |
| 2005/0091161 A1* | 4/2005 | Gustin | ................... | G06Q 20/04 |
| | | | | 235/379 |
| 2015/0170112 A1* | 6/2015 | DeCastro | ............. | G06Q 20/367 |
| | | | | 705/39 |
| 2015/0365283 A1* | 12/2015 | Ronca | ................. | G06Q 20/065 |
| | | | | 705/71 |
| 2019/0102756 A1* | 4/2019 | Zhou | ................. | G06Q 20/3278 |
| 2022/0020011 A1* | 1/2022 | Li | ......................... | G06Q 20/10 |

| | | | | |
|---|---|---|---|---|
| 2022/0084015 A1* | 3/2022 | Fawzy | ............... | G06Q 20/3672 |
| 2022/0398570 A1* | 12/2022 | Yevhenovych | ...... | G06Q 20/381 |
| 2023/0075202 A1* | 3/2023 | Mullins | .............. | G06Q 20/4037 |
| 2023/0281613 A1* | 9/2023 | Goldovskij | .......... | G06Q 20/065 |
| | | | | 705/75 |
| 2024/0037556 A1* | 2/2024 | Amrutiya | ........... | G06Q 20/4014 |
| 2024/0127231 A1* | 4/2024 | Xu | ..................... | G06Q 20/3674 |
| 2024/0202820 A1* | 6/2024 | Bimolaksono | ......... | G06Q 20/36 |
| 2024/0202821 A1* | 6/2024 | Bodell | ................... | G06Q 40/04 |

OTHER PUBLICATIONS

Nakamoto, Satoshi , "Bitcoin: A Peer-to-Peer Electronic Cash System", Retrieved from the Internet: URL:http://nakamotoinstitute. org/static/docs/bitcoin.pdf, [Retrieved on Jul. 4, 2017], Oct. 31, 2008, pp. 1-9.

* cited by examiner

300

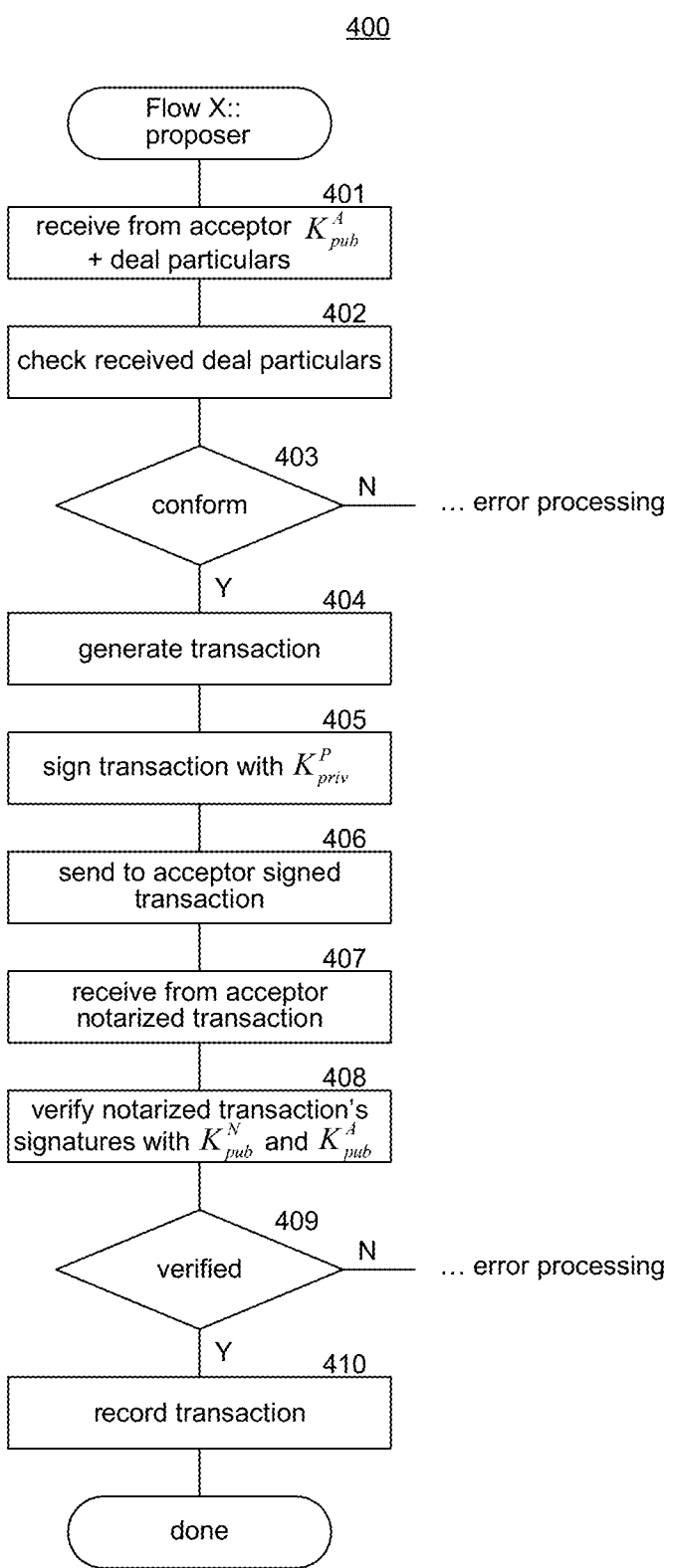
_FIG. 4_

<u>600</u>

PF::
create flow protocol flow, role,
entities

601 record checkpoint

602 retrieve code of role

603 launch execution of code

604

IPs = map service (entities)

605 establish sessions done

1600 relink references in
constant

1601 select next reference

1602 all already selected   Y  → done

N

1603 relink to corresponding shadow
code

1700

SECURE PROCESSING OF CENTRAL BANK DIGITAL CURRENCY (CBDC) CARD PAYMENTS

CROSS-REFERENCE TO RELATED APPLICATION

This application claims the benefit of U.S. Provisional Patent Application No. 63/439,055, filed Jan. 13, 2023, which is incorporated herein by reference in its entirety.

BACKGROUND

The bitcoin system was developed to allow electronic cash to be transferred directly from one party to another without going through a financial institution, as described in the white paper entitled "Bitcoin: A Peer-to-Peer Electronic Cash System" by Satoshi Nakamoto. A bitcoin (e.g., an electronic coin) is represented by a chain of transactions that transfers ownership from one party to another party. To transfer ownership of a bitcoin, a new transaction is generated and added to a stack of transactions in a block. The new transaction, which includes the public key of the new owner, is digitally signed by the owner with the owner's private key to transfer ownership to the new owner as represented by the new owner public key. Once the block is full, the block is "capped" with a block header that is a hash digest of all the transaction identifiers within the block. The block header is recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

To ensure that a previous owner of a bitcoin did not double-spend the bitcoin (i.e., transfer ownership of the same bitcoin to two parties), the bitcoin system maintains a distributed ledger of transactions. With the distributed ledger, a ledger of all the transactions for a bitcoin is stored redundantly at multiple nodes (i.e., computers) of a blockchain network. The ledger at each node is stored as a blockchain. In a blockchain, the transactions are stored in the order that the transactions are received by the nodes. Each node in the blockchain network has a complete replica of the entire blockchain. The bitcoin system also implements techniques to ensure that each node will store the identical blockchain, even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The bitcoin system also implements techniques to ensure that it would be infeasible to change a transaction and regenerate the blockchain by employing a computationally expensive technique to generate a nonce that is added to the block when it is created. A bitcoin ledger is sometimes referred to as an Unspent Transaction Output ("UXTO") set because it tracks the output of all transactions that have not yet been spent.

Although the bitcoin system has been very successful, it is limited to transactions in bitcoins or other cryptocurrencies. Efforts are currently underway to use blockchains to support transactions of any type, such as those relating to the sale of vehicles, sale of financial derivatives, sale of stock, payments on contracts, and so on. Such transactions use identity tokens, which are also referred to as digital bearer bonds, to uniquely identify something that can be owned or can own other things. An identity token for a physical or digital asset is generated using a cryptographic one-way hash of information that uniquely identifies the asset. Tokens also have an owner that uses an additional public/private key pair. The owner public key is set as the token owner identity and when performing actions against tokens, ownership proof is established by providing a signature generated by the owner private key and validated against the public key listed as the owner of the token. A person can be uniquely identified, for example, using a combination of a user name, social security number, and biometric (e.g., fingerprint). A product (e.g., refrigerator) can be uniquely identified, for example, using the name of its manufacturer and its serial number. The identity tokens for each would be a cryptographic one-way hash of such combinations. The identity token for an entity (e.g., person or company) may be the public key of a public/private key pair, where the private key is held by the entity. Identity tokens can be used to identify people, institutions, commodities, contracts, computer code, equities, derivatives, bonds, insurance, loans, documents, and so on. Identity tokens can also be used to identify collections of assets. An identity token for a collection may be a cryptographic one-way hash of the digital tokens of the assets in the collection. The creation of an identity token for an asset in a blockchain establishes provenance of the asset, and the identity token can be used in transactions (e.g., buying, selling, insuring) of the asset stored in a blockchain, creating a full audit trail of the transactions.

To record a simple transaction in a blockchain, each party and asset involved with the transaction needs an account that is identified by a digital token. For example, when one person wants to transfer a car to another person, the current owner and next owner create accounts, and the current owner also creates an account that is uniquely identified by its vehicle identification number. The account for the car identifies the current owner. The current owner creates a transaction against the account for the car that indicates that the transaction is a transfer of ownership transfer, indicates the public keys (i.e., identity tokens) of the current owner and the next owner, and indicates the identity token of the car. The transaction is signed by the private key of the current owner and the transaction is evidence that the next owner is now the current owner.

To enable more complex transactions than bitcoin can support, some systems use "smart contracts." A smart contract is computer code that implements transactions of a contract. The computer code may be executed in a secure platform (e.g., an Ethereum platform, which provides a virtual machine) that supports recording transactions in blockchains. In addition, the smart contract itself is recorded as a transaction in the blockchain using an identity token that is a hash (i.e., identity token) of the computer code so that the computer code that is executed can be authenticated. When deployed, a constructor of the smart contract executes, initializing the smart contract and its state. The state of a smart contract is stored persistently in the blockchain. When a transaction is recorded against a smart contract, a message is sent to the smart contract, and the computer code of the smart contract executes to implement the transaction (e.g., debit a certain amount from the balance of an account). The computer code ensures that all the terms of the contract are complied with before the transaction is recorded in the blockchain. For example, a smart contract may support the sale of an asset. The inputs to a smart contract to sell a car may be the identity tokens of the seller, the buyer, and the car and the sale price in U.S. dollars. The computer code ensures that the seller is the current owner of the car and that the buyer has sufficient funds in their account. The computer code then records a transaction that transfers the ownership of the car to the buyer and a transaction that transfers the sale price from the buyer's account to the seller's account. If the seller's account is in U.S. dollars and the buyer's account is Canadian dollars, the computer code may retrieve a currency exchange rate, determine how many Canadian dollars the seller's account should be debited, and record the exchange rate. If either transaction is not successful, neither transaction is recorded.

When a message is sent to a smart contract to record a transaction, the message is sent to each node that maintains a replica of the blockchain. Each node executes the computer code of the smart contract to implement the transaction. For example, if 100 nodes each maintain a replica of a blockchain, then the computer code executes at each of the 100 nodes. When a node completes execution of the computer code, the result of the transaction is recorded in the blockchain. The nodes employ a consensus algorithm to decide on which transactions to keep and which transactions to discard. Although the execution of the computer code at each node helps ensure the authenticity of the blockchain, it requires large amounts of computer resources to support such redundant execution of computer code.

The term "contract" has been used to describe the computer code of a contract under the UXTO model of bitcoin and the computer code of the "smart contracts" model of the Ethereum platform. The "contracts" under these models are, however, different. In the UXTO model, the distributed ledger is a set of immutable rows keyed by (hash: output index) values. The "hash" is a hash of the transaction that generated the output represented by the row, and the "output index" identifies which one of the possibly many outputs of the transaction that the row represents. A UXTO contract is deterministic and performs no processing other than validating the inputs to the transaction. In the "smart contract" model, the computer code of the smart contract is an instantiation of the computer code that is maintained by every node that stores the block chain. A "smart contract" can perform virtually any type of processing such as receiving messages, sending messages, accessing external databases, and so on.

BRIEF DESCRIPTION OF THE DRAWINGS

Detailed descriptions of implementations of the present invention will be described and explained through the use of the accompanying drawings.

FIG. 4 is a flow diagram that illustrates processing of an example flow for the role of the proposer of the protocol flow of FIG. 3 in some embodiments.

Figure 1:
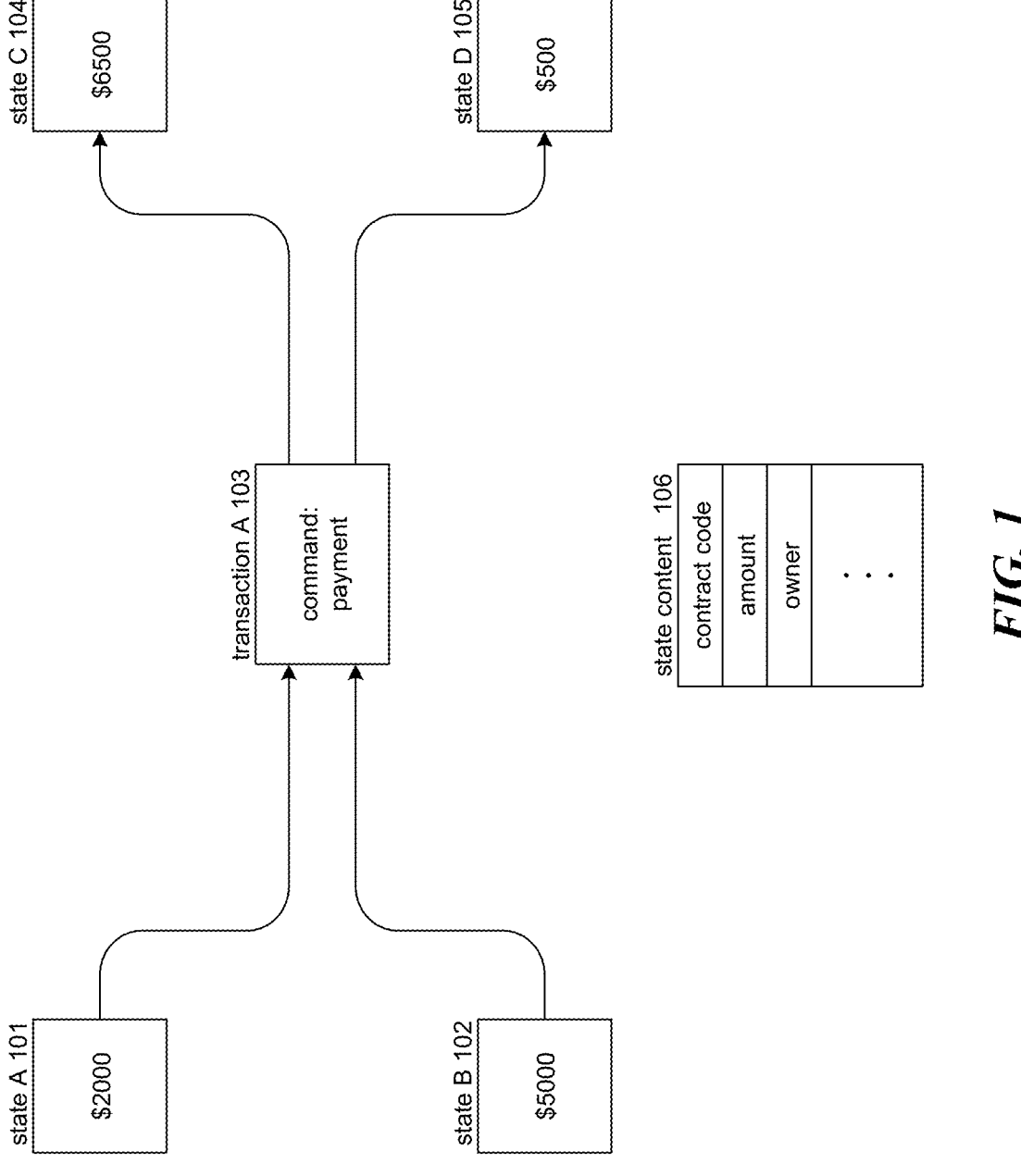
FIG. 1 is a diagram that illustrates an example a transaction in some embodiments.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

A central bank digital currency (CBDC) is a type of digital currency that is equivalent to a country's fiat currency. Although CBDCs carry the value of fiat currency, it is currently difficult to use CBDCs as payment for good or services because existing consumer payment infrastructure does not support token-based transactions. To solve this problem, the inventors have conceived of and reduced to practice a scheme that enables CBDCs to be used in card-based transactions at merchant points-of-sale. According to some implementations, a card issuer node in a distributed ledger environment receives a payment message from a payment terminal. The payment message, comprising a request to conduct a transaction in which CBDC tokens will be transferred from a payer to a payee, contains a signature transmitted to the payment terminal by a payment card. The card issuer node generates a signature data structure that contains the signature. The card issuer node also generates a transaction message containing components of the transaction, such as a number of tokens to be transferred, a current owner of the tokens to be transferred, an intended acquirer of the tokens, a currency type of the tokens, and/or instructions for validating the transaction. The transaction is validated based at least in part on the signature data structure in the transaction message.

Decentralized Distributed Ledger Transactions

A method and system are provided to support a decentralized distributed ledger in which transactions are recorded by parties to the transactions without the use of a blockchain. In some embodiments, a distributed ledger system provides a protocol framework that supports the development of protocol flows. A protocol flow is computer code that controls the performance of a transaction by the party or parties to the transaction. Protocol flows can be developed for different types of transactions, such as a transaction to sell an asset from a selling party to a buying party, a transaction to support an interest rate swap, a transaction involving more than two parties, and so on. An example will help illustrate a protocol flow. In this example, a "transfer" transaction specifies to transfer a certain amount of money from an "originator" party to an "responder" party. To support such a transfer transaction, a transfer protocol flow would be developed that includes computer code for the party in the role of the originator ("originator code") and computer code for the party in the role of responder ("responder code"). When the two parties agree to consummate the transaction, they agree on the particulars of the transaction, such as the amount of money to transfer, the notary who is responsible for notarizing the transaction, and to use the transfer protocol flow.

Continuing with the example of the transfer transaction, to record the transfer transaction, the originator party starts execution of the originator code of the transfer protocol flow, and the responder party starts execution of the responder code of the transfer protocol flow. The originator party provides the particulars of the transaction to the originator code. The originator code then sends to the responder party its public key and the particulars of the transaction. Upon receiving the public key and the particulars of the transaction, the responder code verifies the particulars of the transaction (e.g., prompting a user to confirm the price). generates a proposed transaction that outlines the particulars of the transaction, signs the proposed transaction with the signature of the responder party (e.g., using a private key of the responder party), and sends the proposed transaction to the originator code. The proposed transaction specifies input state, output state, and identification of a notary. The input state may specify the funds used to buy the asset, and the output state may specify that ownership of the asset has been transferred. The input state and the output state include contract code that is used to verify whether the transaction is valid. Upon receiving the proposed transaction, the originator code verifies the proposed transaction by verifying that the proposed transaction was signed by the responder party (e.g., using the public key of the responder party), verifying that the particulars of the proposed transaction match those sent to the responder party, and executing the contract code of the input state and output state of the proposed transaction to determine whether the proposed transaction is valid according to the contract code. When the proposed transaction is valid, the originator code accepts the proposed transaction by signing the proposed transaction with the signature of the originator party to generate an accepted transaction. The originator code then sends the accepted transaction to notary code of the notary specified in the proposed transaction. The notary code may be considered computer code of the transfer protocol code for the role of notary. Execution of the notary code may have started when the parties decided to consummate the transaction.

Continuing with the example, when the notary code receives the accepted transaction, the notary verifies that the accepted transaction has been signed by the originator party and the responder party. The notary then determines whether the input state to the accepted transaction has been already consumed (e.g., spent by another transaction). The notary may maintain a consumed state storage to track the output states that have been consumed by transactions. If the input state has not been consumed, then the notary code marks the output state of the transaction that is the input state for the accepted transaction as now consumed and notarizes the accepted transaction by signing the accepted transaction with the signature of the notary to generate a notarized transaction. The notary code then sends the notarized transaction to the originator code.

Continuing with the example, upon receiving the notarized transaction, the originator code verifies that the notarized transaction has been signed by the notary, records the notarized transaction in its ledger, and sends the notarized transaction to the responder code. Upon receiving the notarized transaction, the responder code verifies that the notarized transaction has been signed by the notary and the originating party and records the notarized transaction in its ledger. In this way, both the originator party and the responder party maintain a copy of the notarized transaction in their ledgers as evidence of the notarized transaction. The output state of the notarized transaction can be used as an input state to a subsequent transaction, and the notarized transaction can be provided as evidence that the output state that is being used as an input state in a subsequent transaction is valid output of the notarized transaction. For example, when verifying that the input state of a proposed transaction was a valid output of the prior transaction, the party that sent the proposed transaction may be requested to provide evidence of each prior transaction whose output state is being used as an input state to the proposed transaction. Although the proposed transaction of this example is described as having one input state and one output state, a transaction can have zero or more input states and zero or more output states, as long as the transaction has at least one input state or one output state.

The distributed ledger system thus allows transactions to be proposed, accepted, and notarized by a notary and stored without the use of a blockchain ledger. In this way, the distributed ledger system can avoid the expense of the computational and storage resources needed to redundantly verify a transaction and store evidence on the many nodes of a blockchain distributed ledger.

In some embodiments, the computer code of a protocol flow can be of arbitrary complexity. For example, a protocol flow can be developed to support transactions between any number of parties. In such a case, each party to the transaction would execute computer code for its role in the protocol flow (e.g., insurer, reinsurer) that verifies, signs, and records the transaction as it is passed between parties and to and from the notary.

In some embodiments, the distributed ledger system provides a protocol framework that supports the development and execution of protocol flows. The protocol framework may provide a checkpoint service, a messaging service, a mapping service, a deterministic virtual machine service, a status service, and so on that are used by the protocol flows. In addition, a protocol flow may invoke other protocol flows, referred to as sub-protocol flows, so that many protocol flows can share the same sub-protocol flow that represents activities commonly performed by protocol flows. For example, a sub-protocol flow may be developed to support the processing associated with a party requesting that an accepted transaction be notarized.

In some embodiments, the protocol framework provides a messaging service that securely and reliably sends messages between nodes executing a protocol flow. When a protocol flow at a node is to communicate with another node, the messaging service may establish a session with the other node so that messages can be transmitted securely (e.g., via symmetric encryption). A session may have a universally unique identifier ("UUID"). The messaging service persists sessions across node restarts and network outages. A session is used to group the messages of a protocol flow. The messaging service also ensures delivery of a message and may require a receiving node to confirm receipt of a message (e.g., the confirmation may include a hash of the received message). The messaging service may provide an application programming interface that includes a send message and a receive message function.

In some embodiments, the checkpoint service generates checkpoints during execution of the protocol flow to support the restarting of the protocol flow from the last checkpoint in case of failure. The checkpoint service may generate a checkpoint whenever a protocol flow interacts with the protocol framework. For example, when a protocol flow requests the protocol framework to send a message (e.g., to a notary to request that an accepted transaction be notarized), the protocol framework generates a checkpoint. A checkpoint includes the state of the protocol flow at the time of the checkpoint. For example, the state may include the program counter, register values, the content of the stack, and the content of the heap of the computer code of the protocol flow. The checkpoint service may employ a garbage collection technique to collect the content of the heap that is currently accessible to the program. The checkpoint service then stores the checkpoint persistently. If execution of the protocol flow terminates, such as by a power failure at the node executing the protocol flow or by restarting the node for maintenance reasons, the latest checkpoint for each protocol flow can be retrieved and restored to resume execution of the protocol flow. The checkpoint service may generate the checkpoints in a manner that is transparent to the protocol flows so that a developer of a protocol flow need not add checkpoint code to a protocol flow.

In some embodiments, the checkpoint service may rewrite a protocol flow prior to execution so that it is resumable, rather than identifying and saving the entire state of the protocol flow as described above. To rewrite a protocol flow, the checkpoint service may employ a Quasar-like tool (see Quasar library by ParallelUniverse) to rewrite the protocol flow. The tool rewrites the classes of computer code to implement a resumable state machine. The tool operates on the bytecodes of the computer code. The result of this rewriting, however, can be illustrated using the following source computer code:

```
fun doFlow( ) {
    Send W to A
    Receive X from A
    Send Y to B
    Receive Z from B
}
```

The result of the rewriting is as follows:

```
fun doFlow(resumeFrom: Integer) throws SuspendExecution {
    switch(resumeFrom) {
        case 0:
            Send W to A
            increment resumeFrom
        case 1:
            Receive X from A, throws SuspendExecution exception if no
                message ready.
            increment resumeFrom
        case 2:
            Send Y to B
            increment resumeFrom
        case 3:
            Receive Z from B, throws SuspendExecution exception if no
                message ready.
            increment resumeFrom
    }
}
```

When the rewritten protocol flow is started, the protocol framework calls "doFlow(0)" to start from the beginning. During each call to the send or receive (message) function of the messaging service, the checkpoint service stores the current value of "resumeFrom," along with other code state such as values of variables. When the protocol flow needs to be restarted, then the protocol framework calls "doFlow (resumeFrom)" to continue from the point of the last checkpoint. The checkpoint service rewrites the "receive" calls so that they "suspend" if there is no message waiting to be received by throwing an exception and thus terminating the "doFlow" function. When a message is received for the protocol flow, the checkpoint service restarts the "doFlow" function passing resumeFrom so that the protocol flow continues at the receive call without having to re-execute the code that was already executed.

In some embodiments, the protocol framework provides a mapping service that maps identities of entities to their corresponding address (e.g., Internet Protocol ("IP") address). The entities may include parties to a transaction, notaries, oracles, and so on. The identity and address of each entity is registered with the mapping service. When a message is to be sent to an entity, the message is provided to the messaging service along with the identity of the entity to which the message is to be sent. The messaging service uses the mapping service to identify from the identity the address of the entity to which the message is to be sent.

In some embodiments, the protocol framework provides a status service through which a protocol flow can report its current status. The status service may provide a status function that can be called by a protocol flow to report its current status. For example, a protocol flow may report that is awaiting a response from a notary. The status service may also provide an interface (e.g., user interface) through which an administrator, another user, or a program can track and/or determine the current status of a protocol flow. For example, if a protocol flow has been waiting for a response from a notary for an unusually long time, an administrator may be notified to investigate because the node on which the notary executes may have failed.

In some embodiments, the protocol framework ensures that contract code executes in a deterministic manner such that the contract code produces the same output state for the same input state so that parties can agree on whether a transaction is valid. Because transaction types are defined using bytecodes (e.g., of a Java virtual machine "JVM"), the execution of the bytecodes should be fully deterministic. Standard virtual machines, such as a JVM, may not be fully deterministic. To ensure that the execution of the bytecodes is deterministic, the protocol framework includes a deterministic virtual machine service that modifies contract code to ensure that it executes deterministically as described below in detail.

In some embodiments, a transaction includes input references, output states, commands, attachments, a timestamp, signatures (e.g., of parties and notary), and a summary. An input reference identifies an output state of a prior transaction that is an input state to this transaction. An input reference may include a hash of the prior transaction and an identifier of the output state of that prior transaction. An output state identifies the output of the transaction, such as the new owner (e.g., of funds or another financial instrument), dollar amount, type of transaction, a reference to contract code, a reference to text of the contract, and so on. A command is an input to the contract code. For example, a command may specify a further refinement of verification of the transaction. A command may also have one or more associated identifications (e.g., public keys) of parties whose signatures are needed as approval for use of the command as an input parameter. An attachment is a file (e.g., a Zip file) that can contain arbitrary content that is accessible to the contract code. A timestamp is a time range in which the transaction is asserted to have occurred. A timestamp may be needed, for example, because of regulatory requirements or as proof of time of payment. The signature of a notary on a transaction indicates that the notary has confirmed that the timestamp is accurate. A summary is a text description that may be displayed to a user approving a transaction as evidence of the content of the transaction.

In some embodiments, a notary service of the distributed ledger system provides transaction ordering and timestamping services in addition to transaction verification and notarizing services. The notary service may be provided by a notary service that decides whether to notarize a transaction or a notary service that interfaces with other mistrusting notary services who use a consensus algorithm such as a Byzantine fault tolerance algorithm or a Raft consensus algorithm to decide whether to notarize a transaction. The notary services receive accepted transactions, verify whether the input states of the transactions have been consumed, and if they have not, sign the accepted transaction. If a network has multiple notaries, then notary services can seamlessly be phased in or out, a notary service can be jurisdiction-specific to comply with jurisdictional regulations, notary services can compete based on availability and performance, and so on.

In some embodiments, the protocol framework supports the scheduling of events. For example, a protocol flow may need to manage expiration of an option contract, to manage a contract default, to re-fix an interest rate swap, and so on. To support the scheduling of events, the contract code of a state (i.e., input or output) may have a scheduling function for providing the next time a protocol flow is to be executed to process the state. When a notarized transaction is recorded, the protocol framework invokes the scheduling function of the state (e.g., output state) of the notarized transaction. The scheduling function returns a time in which a protocol flow is to be next executed. The protocol framework records the time and then starts the protocol flow at the recorded time.

FIG. 1 is a diagram that illustrates an example transaction in some embodiments. A transaction A 103 is proposed to make both a contract payment and an associated insurance payment for the contract. Transaction A specifies the input states of input state A 101 and input state B 102. The input state A specifies that the owner has $2000, and the input state B specifies that the owner has $5000. Transaction A specifies the output states of output state C 104 and output state D 105. The output state C specifies to make a contract payment of $6500, and the output state D specifies to make an insurance payment of $500. State content 106 illustrates example content of a state. To propose transaction A, the proposing (or proposer) party executes a protocol flow for the transaction. The protocol flow generates transaction A, which specifies the input states, the output states, and an identifier of a notary. The output states may identify the accepting (or acceptor) parties for accepting the contract payment and the insurance payment. The protocol flow then signs transaction A with the private key of the proposing party and sends transaction A as a proposed transaction to the accepting parties in sequence. Each accepting party verifies that transaction A has been signed by the proposing party and invokes the contract code of the input states and at least its output state to ensure that the proposed transaction complies with the terms of the contract. Each accepting party then accepts transaction A by signing transaction A with its private key and sends the accepted transaction A to the proposing party. When accepted by all accepting parties, the proposing party submits accepted transaction A to a notary. The notary verifies the signatures of accepted transaction A, timestamps accepted transaction A, ensures that the input states have not yet been consumed, and notarizes the accepted transaction A by signing with the notary's private key to generate a notarized transaction A. The notary then sends the notarized transaction A to the proposing party, who records the notarized transaction A and forwards the notarized transaction A to the accepting parties, who each record the notarized transaction A.

Figure 2:
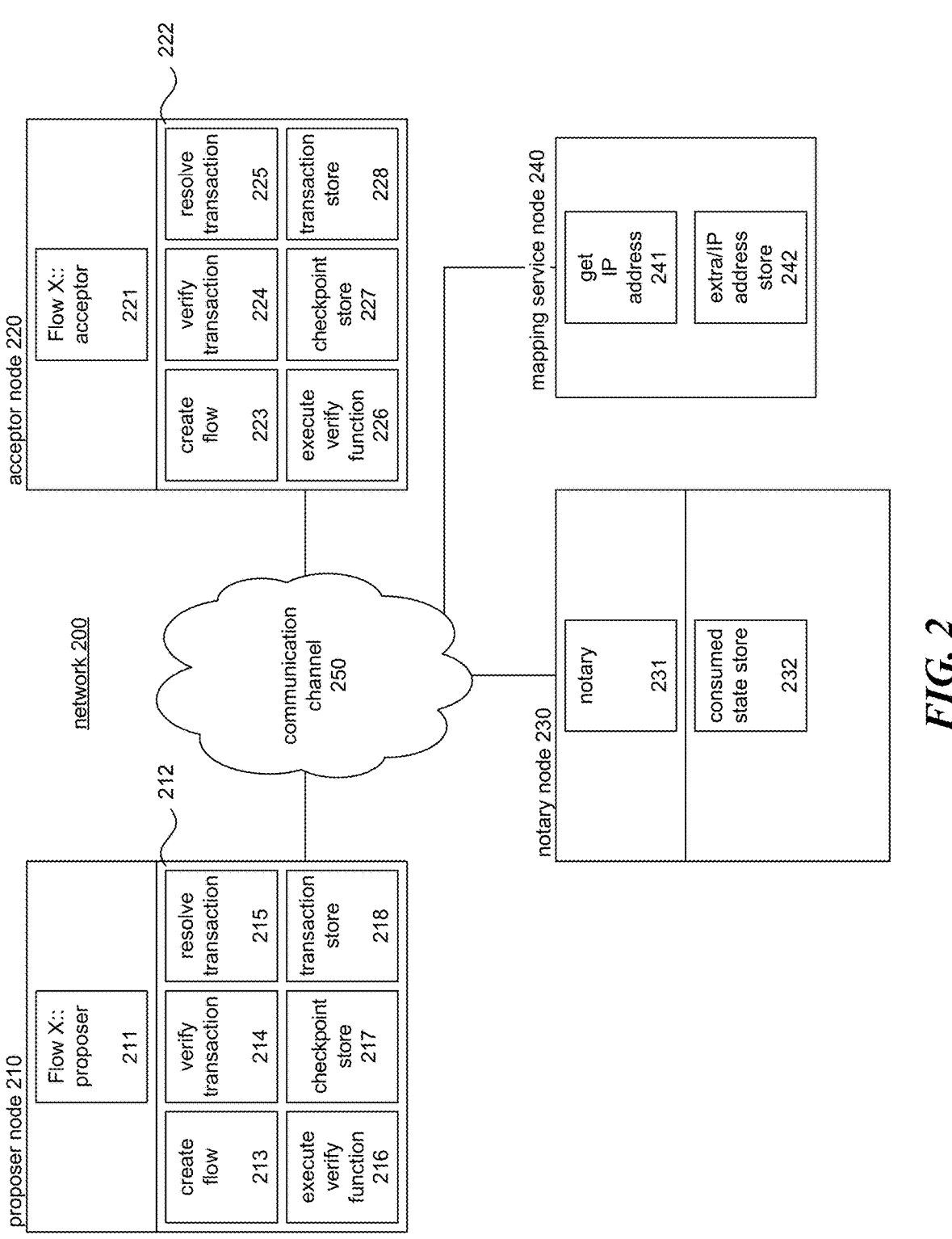
FIG. 2 is a block diagram illustrating components of the distributed ledger system in some embodiments.

FIG. 2 is a block diagram illustrating components of the distributed ledger system in some embodiments. A distributed ledger system may be implemented on nodes of a network 200. Each entity (e.g., party to a contract, notary, mapping service) may have one or more nodes registered with the network. FIG. 2 illustrates that the network includes a proposer node 210, an acceptor node 220, a notary node 230, and a mapping service node 240 that communicate a via communications channel 250. The proposer node includes a protocol flow 211 and protocol framework components 212. The protocol flow 211 may represent the flow for a proposer role of a two-party contract protocol flow. The protocol framework components include a create (or instantiate) flow component 213, a verify transaction component 214, a resolve transaction component 215, an execute verify function component 216, a checkpoint store 217, and a transaction store 218. The create flow component instantiates a protocol flow for execution. The verify transaction component verifies signatures of a proposed transaction, invokes the resolve transaction component to ensure that the input states of the proposed transaction are valid, and invokes the execute verify function to execute the contract code of the input and output states of the proposed transaction to ensure that the proposed transaction complies with the terms of the contract. The checkpoint store component stores checkpoints generated by the checkpoint service (not illustrated)

for restarting a protocol flow. The transaction store, which may be referred to as a vault, stores notarized transactions and may store private keys. The protocol framework components may also include a component for providing notarized transactions to the accepting party for verification of input states, a component for sending and receiving messages, and so on, which are not illustrated in FIG. 2. The acceptor node includes a protocol flow 221, which may represent the flow of an acceptor role of the two-party contract protocol flow, and components 223-226 and stores 227-228, which correspond to components 213-216 and stores 217-218 of the originator node. The notary node includes a notary component 231 and a consumed state store 232. The notary component controls verifying the signatures of an accepted transaction, ensuring that the input states are not yet consumed, and notarizing the accepted transaction. The notary component stores an indication of each consumed state in the consumed state store to prevent double-spending of the consumed output state. The input state may be identified by a hash of the transaction that generated the output state that is being used as the input state along with an identifier of which output state of the transaction is being used as the input state. The mapping service node includes a get IP address component 241 and an entity/IP address store 242. The get IP address component receives a request for an IP address that corresponds to a given identity of an entity and returns the IP address of a node assigned to the entity. The entity/IP address stores a mapping of entity identifiers to IP addresses of their nodes.

The computing systems (e.g., nodes) on which the distributed ledger system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the distributed ledger system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The distributed ledger may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the distributed ledger system may be implemented in hardware using, for example, an application-specific integrated circuit (ASIC) or field programmable gate array ("FPGA").

Figure 3:
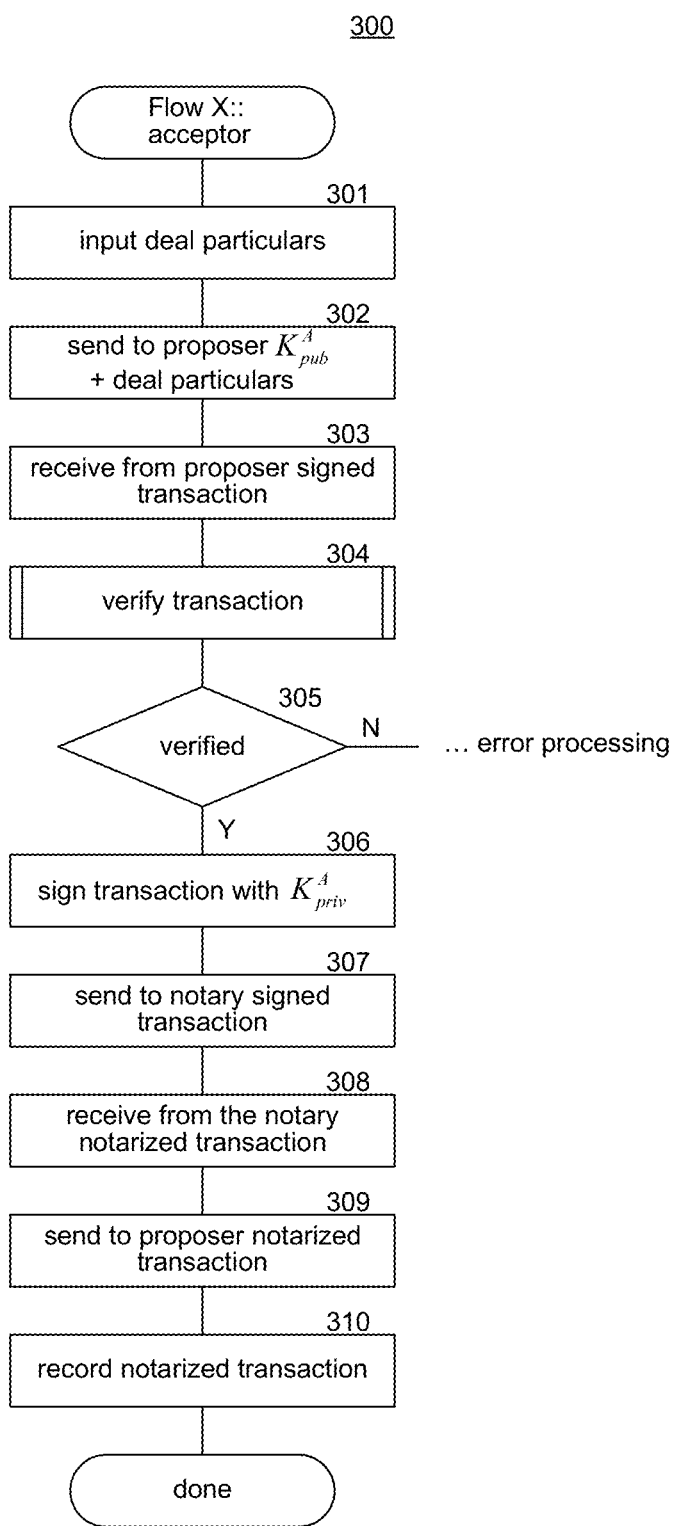
FIG. 3 is a flow diagram illustrating processing of an example flow for the role of an acceptor for a protocol flow in some embodiments.

FIG. 3 is a flow diagram illustrating processing of an example flow for the role of an acceptor for a protocol flow in some embodiments. An acceptor component 300 is executed when an accepting party wants to execute a transaction with a proposing party. The accepting party and the proposing party may agree outside of the distributed ledger system to the terms of the transaction (also referred to as deal particulars). In block 301, the component inputs the deal particulars, such as a dollar amount that is to be transferred between the parties, a notary to use, and so on. In block 302, the component sends to the proposing party the public key (e.g., via a public key certificate) of the accepting party and the deal particulars. In block 303, the component receives from the proposing party a proposed transaction that is signed by the proposing party. In block 304, the component invokes a verify transaction component to verify the proposed transaction, including verifying the signature of the proposing party. In decision block 305, if the proposed transaction has been verified, then the component continues at block 306, else the component performs some error processing such as alerting an administrator. In block 306, the component signs the proposed transaction with the private key of the accepting party to generate an accepted transaction. In block 307, the component sends the accepted transaction to the notary specified in the accepted transaction. In block 308, the component receives from the notary the notarized transaction. In block 309, the component sends to the proposing party the notarized transaction. In block 310, the component records the notarized transaction in the vault of the accepting party. The component then completes.

FIG. 4 is a flow diagram that illustrates processing of an example flow for the role of the proposer of the protocol flow of FIG. 3 in some embodiments. A proposer component 400 is executed when a proposing party wants to execute a transaction with an accepting party. The component initially inputs the deal particulars, such as a dollar amount that is to be transferred between the parties, a notary to use, and so on. In block 401, the component receives from the accepting party the public key of the accepting party and an indication of the deal particulars. Alternatively, the component may retrieve the public key from a certificate authority, from a service that stores public keys, or from some other service. In block 402, the component checks the received deal particulars to ensure that they conform with the input deal particulars. In decision block 403, if the deal particulars conform, then the component continues at block 404, else the component performs error processing such as alerting an administrator. In block 404, the component generates a proposed transaction that specifies the input states, the output states, and the identification of the notary. In block 405, the component signs the proposed transaction with the private key of the proposing party. In block 406, the component sends to the accepting party the signed proposed transaction. In block 407, the component receives from the accepting party a notarized transaction. In block 408, the component verifies the notarized transaction by using the public key of the notary and the public key of the accepting party to ensure that the notarized transaction has been signed by the notary and the accepting party. In decision block 409, if the notarized transaction is verified, then the component continues at block 410, else the component performs some error processing such as alerting an administrator. In block 410, the component records the notarized transaction and then completes. Although not illustrated in FIGS. 3 and 4, the components may periodically notify the protocol framework of the status of the protocol flow so that the protocol framework may publish the status so that the status is available to administrators, error processing components, and so on. For example, the proposer component may update the status when it initially starts up, receives the deal particulars, verifies the deal particulars, sends the proposed transaction, receives the notarized transaction, and records the notarized transaction. In addition, the protocol framework, may generate checkpoints whenever a component passes control to the protocol framework, such as when sending or receiving a message, updating the status, and so on.

Figure 5:
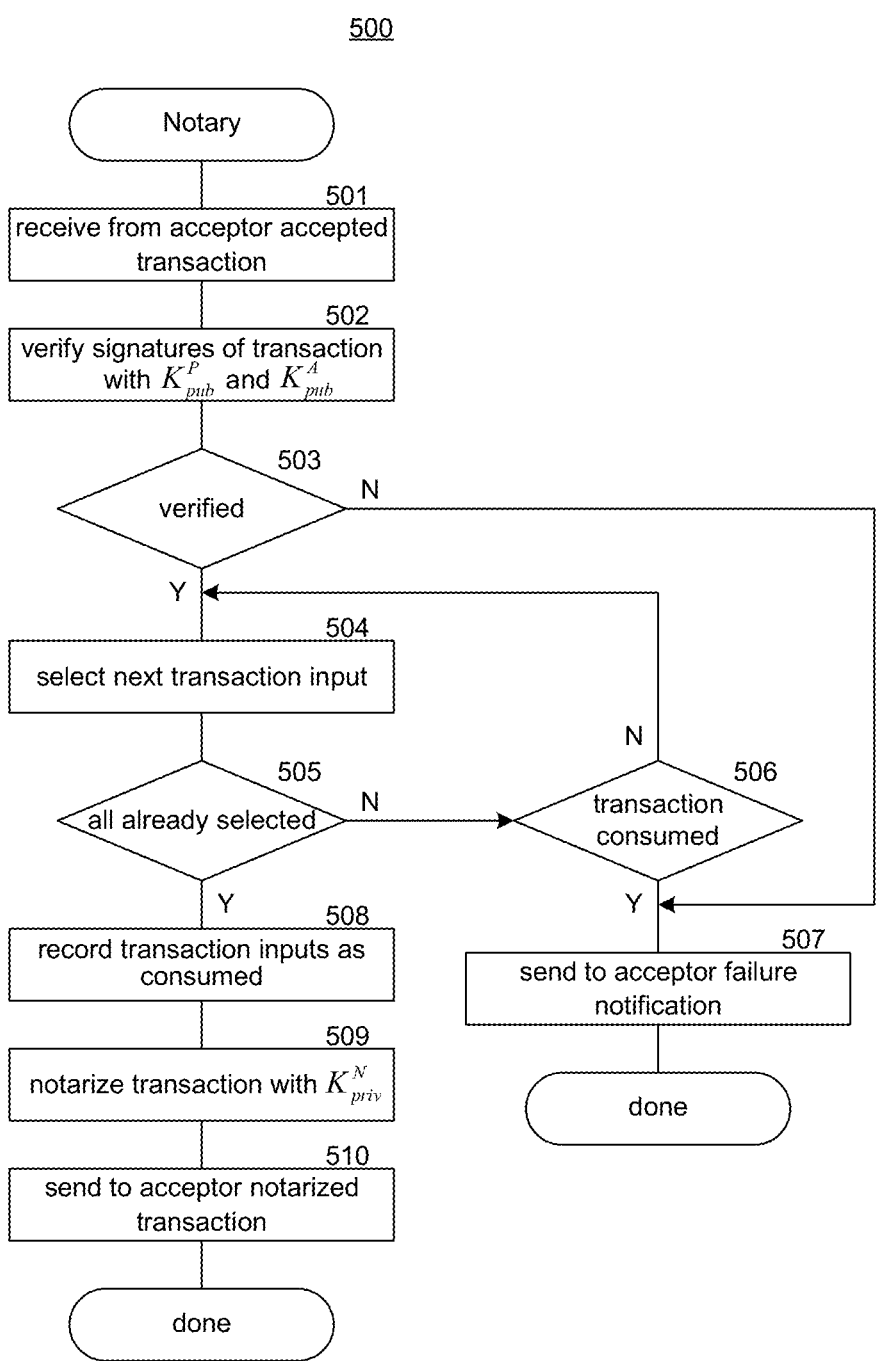
FIG. 5 is a flow diagram that illustrates processing of a notary in some embodiments.

FIG. 5 is a flow diagram that illustrates processing of a notary service in some embodiments. A notary component 500 may be an implementation of a role of a notary for a protocol flow. In block 501, the component receives from the accepting party an accepted transaction that is to be notarized. In block 502, the component verifies the signatures of the accepted transaction using the public keys of the proposing party and the accepting party. In decision block 503, if the signatures are verified, then the component continues at block 504, else the component continues at block 507. In blocks 504-506, the component loops determining whether the input states of the accepted transaction have been consumed. In block 504, the component selects the next input state of the transaction. In decision block 505, if all the input states have already been selected, then none of the input states have been consumed and the component continues at block 508, else the component continues at block 506. In block 506, if the selected input state has been consumed as indicated by the consumed state store, the component continues at block 507, else the component loops to block 504 to select the next input state of the accepted transaction. In block 507, the component sends to the accepting party a failure notification indicating that the transaction cannot be notarized because at least one input state has been consumed and then completes. In some embodiments, the component may also send a notification directly to the proposing party. For example, the proposing party may have registered with the notary service to receive notifications and notarized transactions or the notary flow may automatically send the notifications or notarized transactions to all parties of the transaction. In block 508, the component records the transaction input states as being consumed by updating the consumed transaction store. In block 509, the component notarizes the accepted transaction to generate a notarized transaction by signing it with the private key of the notary. In block 510, the component sends to the accepting party (and optionally to the proposing party) the notarized transaction and then completes.

Figure 6:
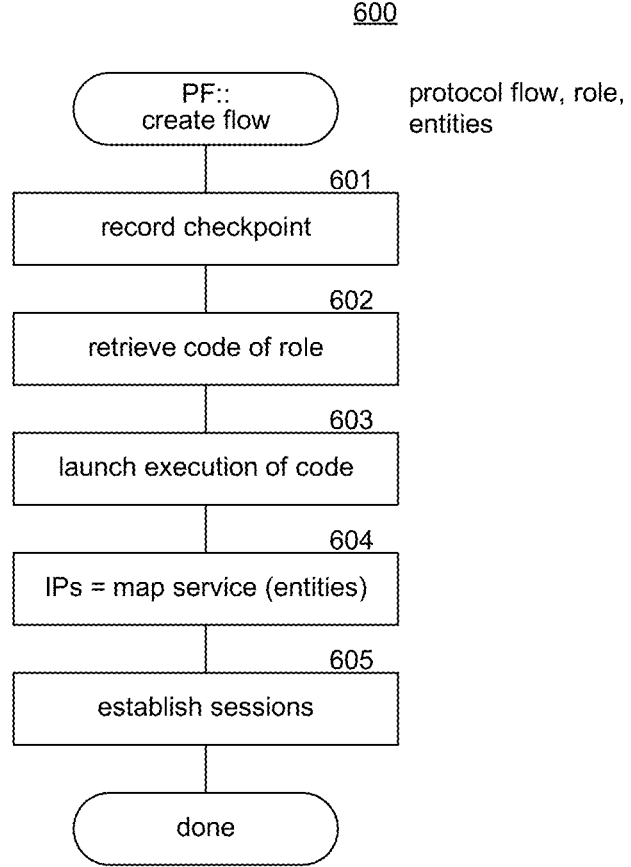
FIG. 6 is a flow diagram that illustrates processing of a create flow component of the protocol framework in some embodiments.

FIG. 6 is a flow diagram that illustrates processing of a create flow component of the protocol framework in some embodiments. A create flow component 600 may be passed an indication of a protocol flow, a role of the protocol flow, and entities involved in the transaction. In block 601, the component may record a checkpoint for the protocol flow. In block 602, the component may retrieve the code for the role of the protocol flow. The component may also rewrite the code to enable it to be resumable if the code has not yet been rewritten. In block 603, the component may launch execution of the code. In block 604, the component may use the mapping service to identify the IP addresses of the entities involved in the protocol flow. In block 605, the component may establish communication sessions with nodes of the entities. Alternatively, the protocol framework may establish the sessions when a protocol flow first sends a message to an entity. The component then completes.

Figure 7:
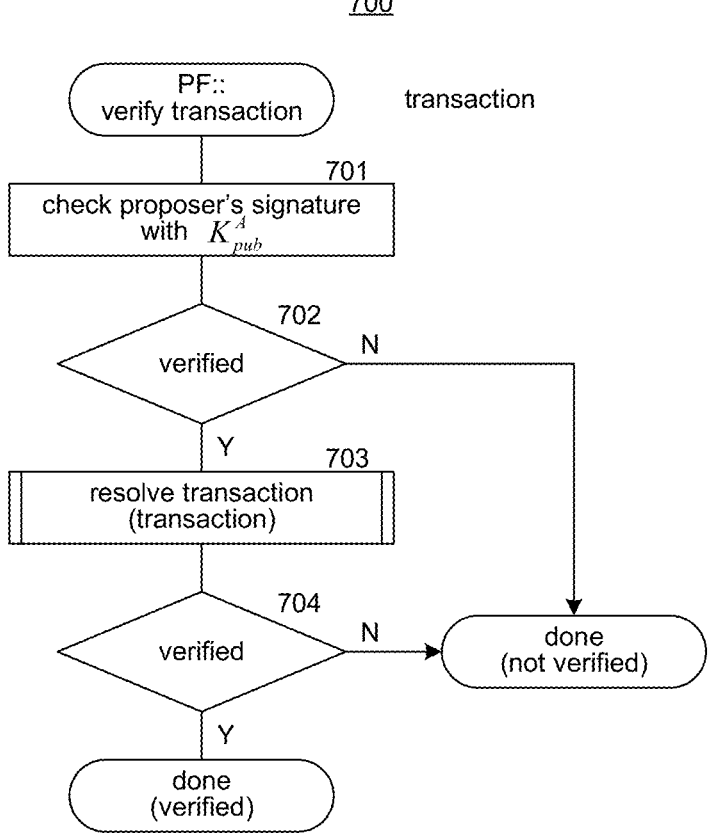
FIG. 7 is a flow diagram that illustrates processing of a verify transaction component of the protocol framework in some embodiments.

FIG. 7 is a flow diagram that illustrates processing of a verify transaction component of the protocol framework in some embodiments. A verify transaction component 700 is invoked by an accepting party to verify the signature of the proposing party and verify that the input states and output states are valid. In block 701, the component uses the public key of the proposing party to check that the proposed transaction has been signed by the proposing party. In decision block 702, if the signature has been verified, then the component continues at block 703, else the component completes and indicates that the proposed transaction is not verified. In block 703, the component invokes a resolve transaction component passing an indication of the proposed transaction to verify whether the contract code of the input states and the output states indicate that the transaction is valid and whether the input states are also from valid transactions. In decision block 704, if the resolve transaction component indicates that the transaction is verified, then the component completes and indicates that the proposed transaction is verified, else the component completes and indicates that the proposed transaction is not verified.

Figure 8:
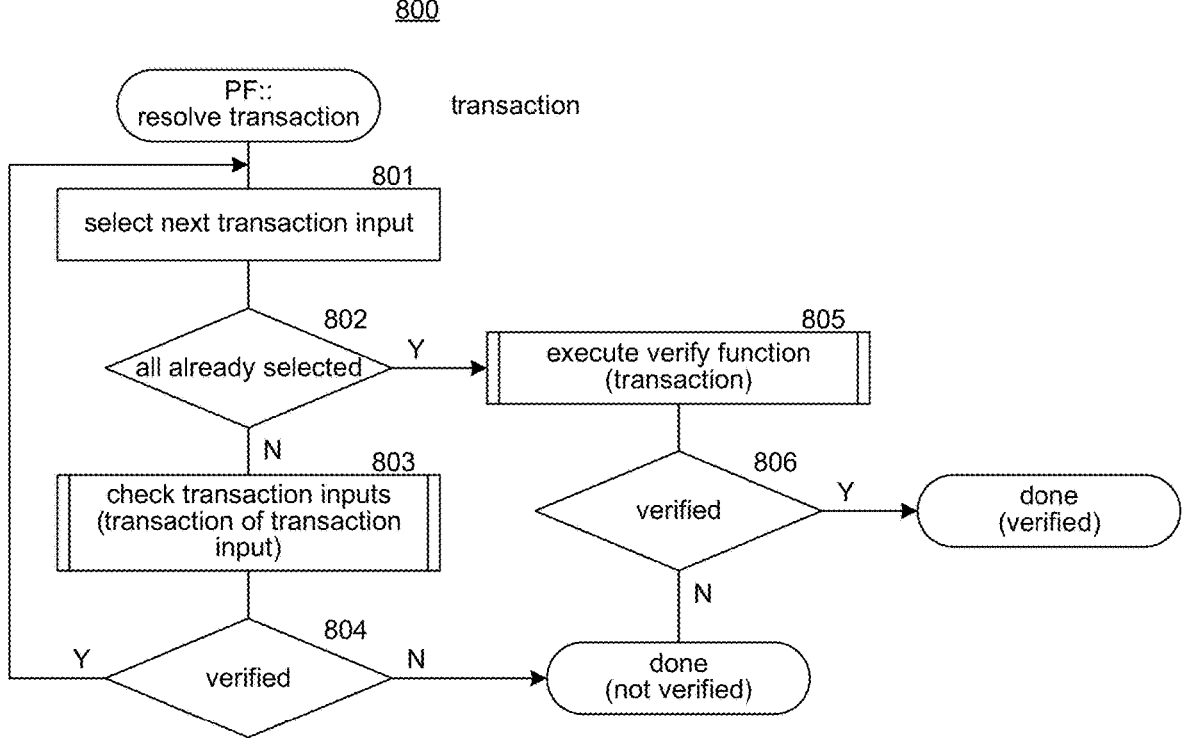
FIG. 8 is a flow diagram that illustrates processing of a resolve transaction component of the protocol framework in some embodiments.

FIG. 8 is a flow diagram that illustrates processing of a resolve transaction component of the protocol framework in some embodiments. A resolve transaction component 800 verifies that the input states to the proposed transaction are output states of valid transactions and that the contract code of the input states and the output states of the proposed transaction indicate that the proposed transaction is valid. In blocks 801-804, the component loops checking the validity of each input state. In block 801, the component selects the next input state of the proposed transaction. In decision block 802, if all the input states have already been selected, then all the input states are valid and the component continues at block 805, else the component continues at block 803. In block 803, the component recursively invokes the check transaction inputs component passing an indication of the transaction of the selected input state. In decision block 804, if the input state has been verified as being valid, then the component loops to block 801 to select the next input state, else the component completes and indicates that the proposed transaction is not verified. In block 805, the component invokes an execute verify function of the protocol framework to invoke the contract code of the proposed transaction to determine whether the proposed transaction complies with the terms of the contract. In decision block 806, if the proposed transaction is verified, then the component completes and indicates that the proposed transaction is verified, else the component completes and indicates that the proposed transaction is not verified.

Figure 9:
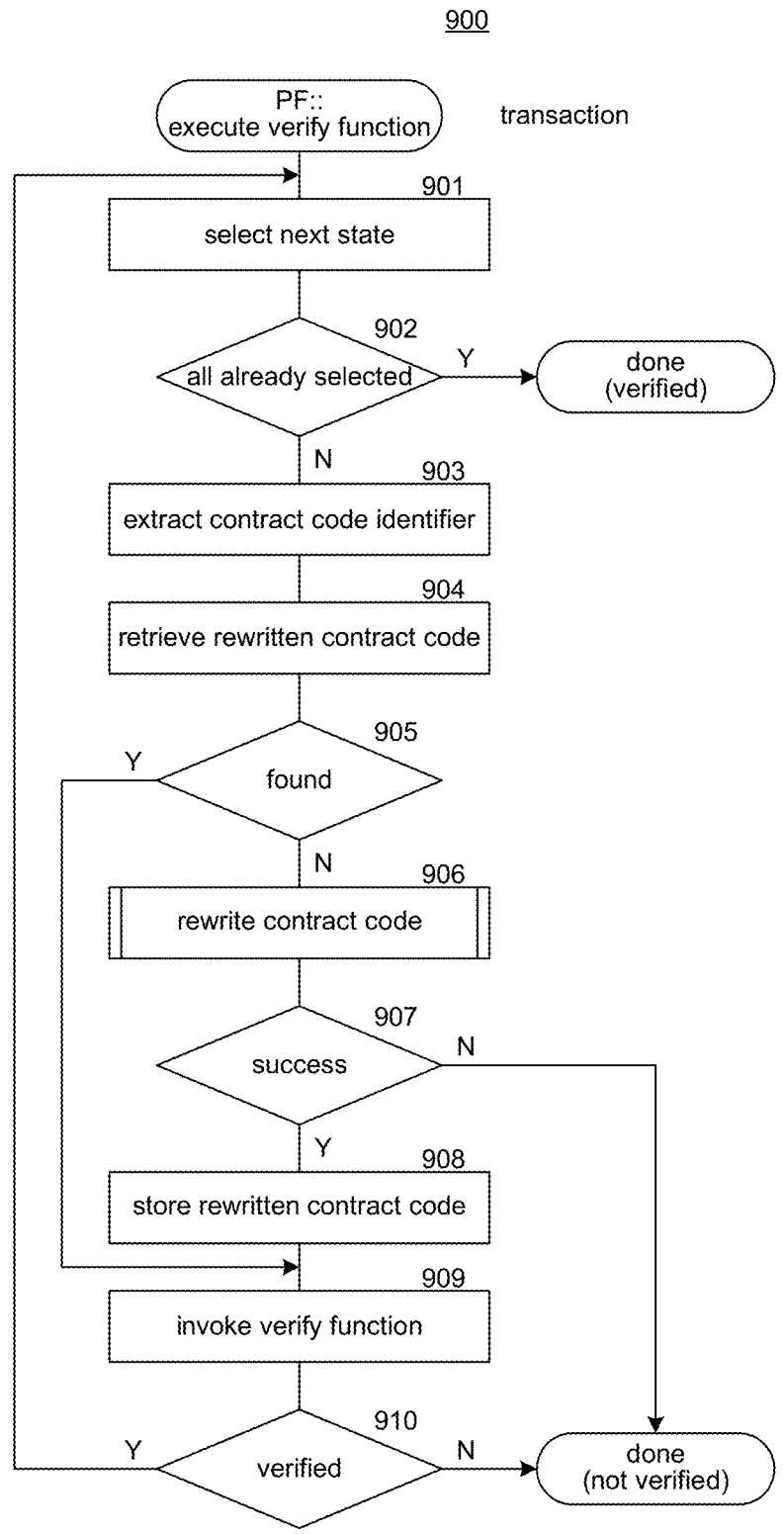
FIG. 9 is a flow diagram that illustrates processing of an execute verify function component of the framework protocol in some embodiments.

FIG. 9 is a flow diagram that illustrates processing of an execute verify function component of the protocol framework in some embodiments. An execute verify function component 900 is invoked to execute contract code associated with the input states and output states of a transaction to determine whether the transaction is valid. The component is responsible for rewriting contract code so that it can be executed deterministically, which is described below in more detail. In block 901, the component selects an input state or output state that has not yet been selected. In decision block 902, if all the input states and output states have already been selected, then the component completes and indicates that the proposed transaction is verified, else the component continues at block 903. In block 903, the component extracts an identifier of the contract code from the selected state of the proposed transaction. In block 904, the component accesses storage to retrieve the contract code if it has already been rewritten. In decision block 905, if the rewritten contract code is found, then the component continues at block 909, else the component continues at block 906. In block 906, the component invokes a rewrite contract code component to rewrite the contract code so that it executes deterministically. In decision block 907, if the rewriting of the contract code was successful, then the component continues at block 908, else the component completes and indicates that the transaction is not verified. In block 908, the component stores the rewritten contract code in the storage for later retrieval to avoid having to rewrite the contract code again. In block 909, the component invokes the verify function of the contract code. The contract code is executed by a virtual machine such as JVM that may be adapted to support deterministic execution of the contract code. In decision block 910, if the verify function verifies that the transaction is valid, then the component loops to block 901 to select another input state or output state, else the component completes and indicates that the proposed transaction is not verified.

Figure 10:
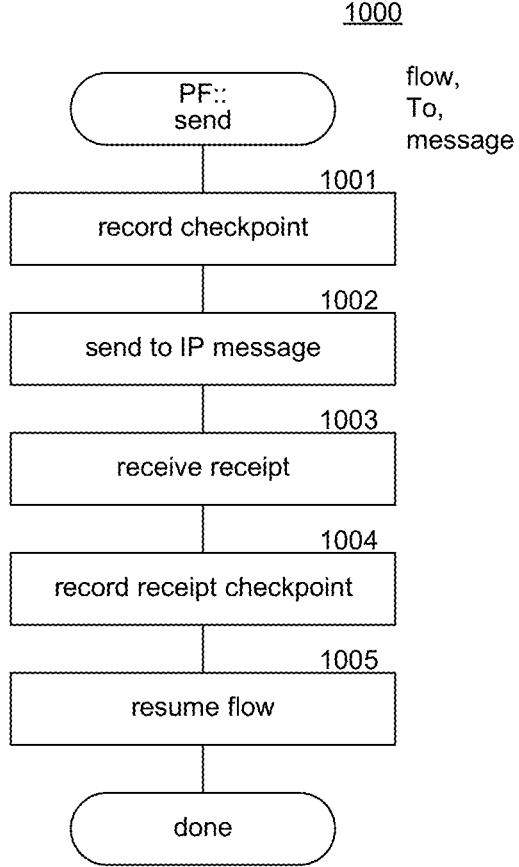
FIG. 10 is a flow diagram illustrating processing of a send message component of the protocol framework in some embodiments.

FIG. 10 is a flow diagram illustrating processing of a send message component of the protocol framework in some embodiments. A send message component 1000 is invoked by a source flow to send a message from the source flow to a target flow executing at nodes in the network. In block 1001, the component suspends execution of the source flow and records a checkpoint for the source flow. In block 1002, the component sends to the IP address of the target flow the message. In block 1003, the component receives a receipt from the target flow (or the protocol framework supporting the target flow) as confirmation that the message was received. In block 1004, the component records a checkpoint indicating that the receipt has been received. In block 1005, the component resumes execution of the source flow and then completes.

Figure 11:
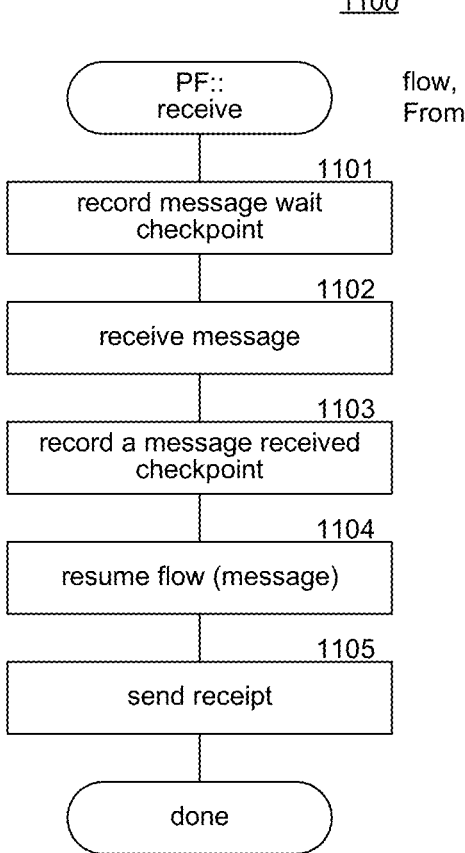
FIG. 11 is a flow diagram that illustrates processing of a receive message component of the protocol framework in some embodiments.

FIG. 11 is a flow diagram that illustrates processing of a receive message component of the protocol framework in some embodiments. A receive message component 1100 is invoked by a target flow to receive a message sent from a source flow. In block 1101, the component suspends execution of the target flow and records a checkpoint for the target flow. In block 1002, the component receives a message from the source flow. In block 1103, the component records a message received checkpoint for the target flow. In block 1104, the component resumes execution of the target flow passing the message to the target flow. In block 1105, the component sends to the source flow a receipt confirming that the message was received and then completes.

Description of Deterministic JVM

The distributed ledger system helps ensure that all nodes that process a transaction agree on whether it is valid or not. Because transaction types are defined using bytecodes (e.g., of a JVM), the execution of the bytecodes should be fully deterministic. Standard virtual machines, such as a JVM, may not be fully deterministic. To ensure that the execution of the bytecodes is deterministic, the protocol framework includes a rewrite contract code component that modifies contract code to ensure that it executes deterministically. Table 1 illustrates example possible sources of non-determinism.

TABLE 1

| Sources of external input (e.g., the file system, network, system properties, and clocks) |
| --- |

TABLE 1-continued

| Random number generators |
| --- |
| Different decisions about when to terminate long running programs |
| Object.hashCode( ) |
| Differences in hardware floating point arithmetic operations |
| Multi-threading |
| Differences in API implementations between nodes |
| Garbage collector callbacks |

To ensure that contract code is fully pure (i.e., deterministic and with no side effects), the distributed ledger system employs a new type of JVM sandbox. The distributed ledger system may rewrite the bytecode based on a static analysis of the bytecode and modify the JVM to control the behavior of hash code generation and invocation if non-deterministic functions. The rewrite contract code component may rewrite the bytecode of a contract code before it is first executed and store the rewritten bytecode for future executions. Table 2 illustrates example tasks performed during the rewriting of the bytecode.

TABLE 2

| Inserts calls to an accounting object before expensive bytecodes |
| --- |
| Prevents exception handlers from catching certain exceptions (e.g., Throwable, Error, or ThreadDeath) |
| Adjusts constant pool references to relink the code against a "shadow" runtime library (e.g., JDK) |
| Directs the use of hardware independent floating-point operations |
| Forbids dynamic invocation (e.g., invokedynamic bytecodes), native methods, and finalizers |

The rewrite contract code component instruments the contract code by inserting calls to an accounting object to deterministically terminate code that has run for an unacceptable amount of time or used an unacceptable amount of memory. The accounting object checks a termination criterion to determine whether to terminate the execution of the contract code. For example, the accounting object may determine an accumulated cost of execution (e.g., based on number and types of bytecodes executed and memory used). The termination criterion may specify that execution of the contract code should terminate when an accumulated cost threshold is reached. Because execution of the contract code is deterministic, given the same input, every execution of the contract code will terminate at the same point that is when the termination criterion is satisfied or when execution terminates normally. Particularly, expensive bytecodes may include method invocation, allocations, backwards jumps, throwing of exceptions, and so on. The rewrite contract code also instruments code that can be transitively reached from the contract code. For example, the shadow runtime library may be instrumented prior to execution of any contract code.

The rewrite contract code component may assess the cost of execution by counting bytecodes that are known to be expensive to execute. Since the size of a method is limited and jumps count towards the cost, the assessment of cost will eventually terminate. However, it is still possible to construct bytecode sequences that take excessive amounts of time to execute even though they do not use expensive operations. For example, contract code with very nested method calls in which the most-nested methods perform inexpensive bytecodes may accumulate to be expensive. The instrumentation of the contract code ensures that infinite loops are terminated and that if the cost of verifying a transaction becomes unexpectedly large (e.g., contains algorithms with complexity exponential in transaction size), all nodes agree precisely on when to terminate. The instrumentation may not provide protection against denial of service attacks. If a node receives transactions that appear designed to simply waste CPU time of the node, then the node can block the sending node.

In some embodiments, because instrumentation may be a high overhead, the rewrite contract code component may statically calculate bytecode costs as much as possible ahead of time and instrument only the entry point of "accounting blocks" such as runs of basic blocks that end with either a method return or a backwards jump. Because only an abstract cost (e.g., a general sense of the magnitude of the cost) matters and because the limits are expected to be set relatively high, the rewrite contract code component not need instrument every basic block. For example, the rewrite contract code component may use the maximum of the cost of the "then" block and the cost of the "else" block of an if-then-else statement when neither block contains a backwards jump. In such a case, the rewrite contract code need only instrument before the if-then-else statement and need not instrument the blocks.

The shadow runtime library duplicates a subset of the standard runtime library, but inside a dedicated sandbox package. The shadow runtime library may omit functionality that contract code is not permitted to access such as file I/O or external entropy (e.g., such as a random number generator).

In some embodiments, the rewrite contract code component may direct the use of hardware independent floating-point operations by setting the strictfp flag on every method of the contract code and of code that is transitively called.

In some embodiments, the rewrite contract code component may prohibit finalizers in contract code because finalizers have been known to be implemented non-deterministically. The rewrite contract code component may prohibit calls via a Java Native Interface as the called application may behave non-deterministically. The rewrite contract code component may prohibit the invoked dynamic bytecode because libraries supporting the invoked dynamic bytecode has been known to have security problems.

In some embodiments, the JVM sandbox may impose a quota on bytes allocated rather than bytes retained. If contract code allocates and quickly deallocates large numbers of bytes (resulting in a small heap size), a quota based on bytes allocated may unnecessarily penalize such contract code. Alternatively, the JVM sandbox may employ a garbage collector to identify the heap size and impose a quota based on heap size.

The Object.hashcode( ) is typically implemented either by returning a pointer address or by assigning the object a random number and thus can result in different iteration orders over hash maps and hash sets. To prevent this non-deterministic behavior, the distributed ledger system may modify calls to the Object.hashCode( ) function with new Java Native Interface ("JNI") calls that reseeds the JVM's thread local random number generator before execution begins. The seed may be derived from the hash of the transaction being verified to ensure that all verifications of the transaction use the same seed and thus the same hash code.

Figure 12:
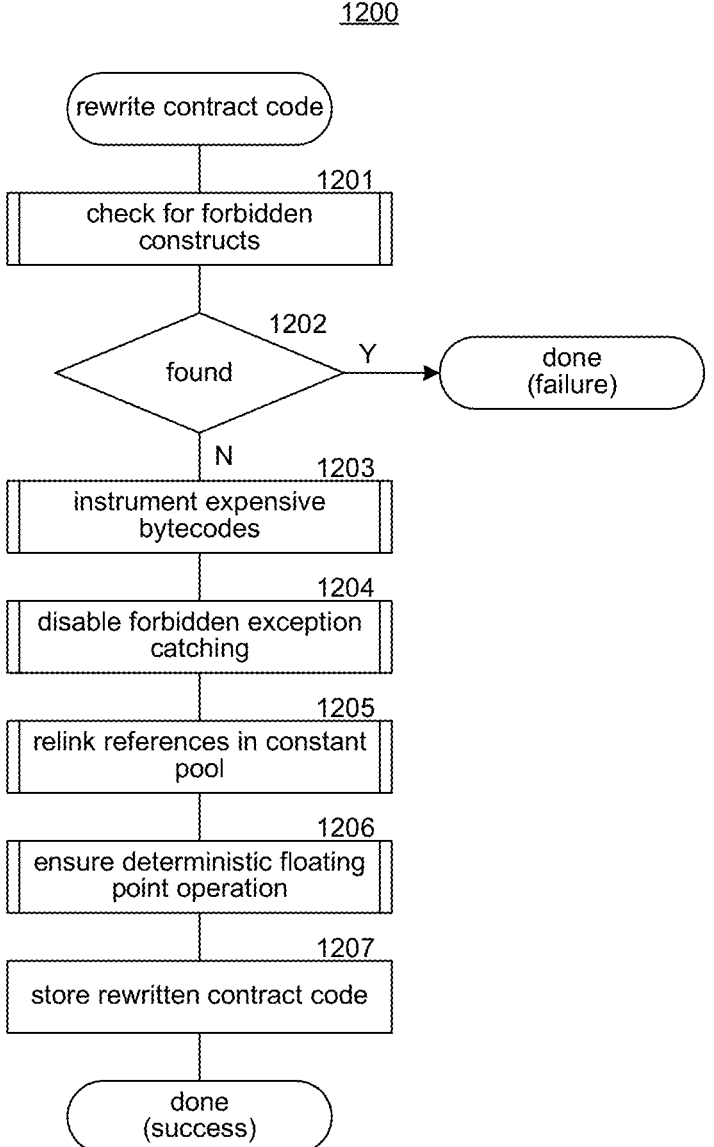
FIG. 12 is a flow diagram that illustrates processing of a rewrite contract code component in some embodiments.

FIG. 12 is a flow diagram that illustrates processing of a rewrite contract code component in some embodiments. A rewrite contract code component 1200 is invoked when contract code is first executed to rewrite the contract code so that it operates deterministically. In block 1201, the component invokes a check for forbidden constructs component to determine whether the contract code includes any forbidden constructs. In decision block 1202, if a forbidden construct is found, then the component completes indicating a failure to rewrite the contract code, else the component continues at block 1203. In block 1203, the component invokes an instrument expensive bytecodes component to instrument bytecodes that are expensive to execute. In block 1204, the component invokes a disable forbidden exception catching component to disable the catching of certain exceptions. In block 1205, the component invokes a relink references in constant pool component to relink references from the runtime library to the shadow runtime library. In block 1206, the component invokes an ensure deterministic floating point operation component to direct that floating-point operations are hardware independent. In block 1207, the component stores the rewritten contract code for subsequent execution and then completes indicating success.

Figure 13:
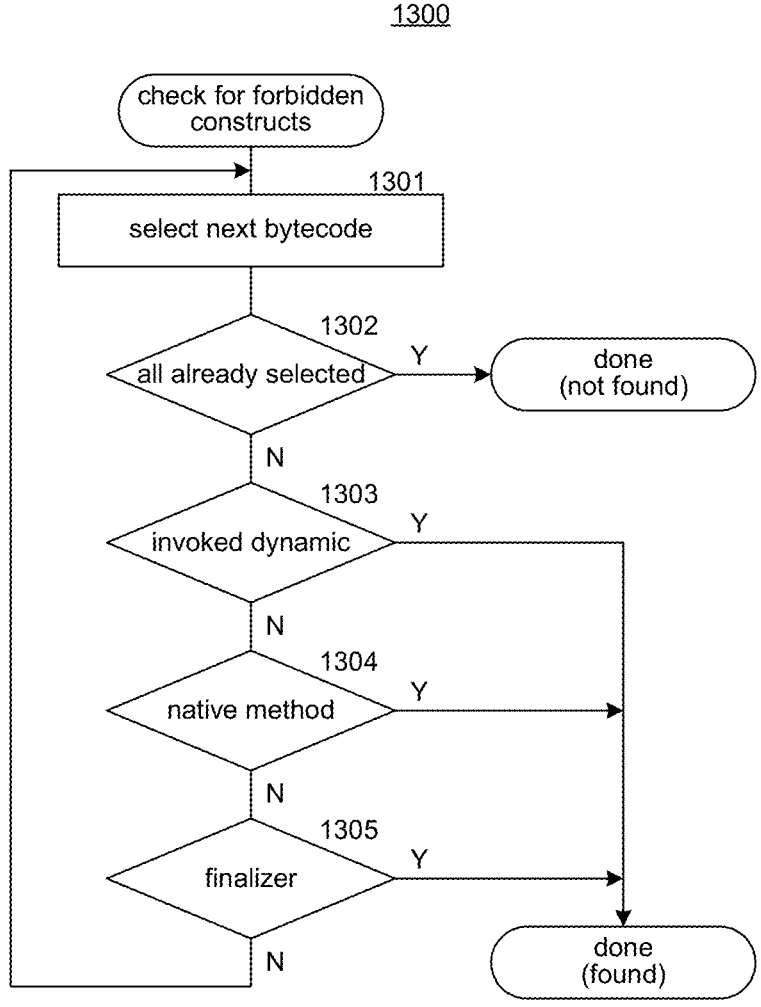
FIG. 13 is a flow diagram that illustrates processing of a check for forbidden constructs component in some embodiments.

FIG. 13 is a flow diagram that illustrates processing of a check for forbidden constructs component in some embodiments. A check for forbidden constructs component 1300 is invoked to ensure that contract code is not executed that includes forbidden constructs. In block 1301, the component selects the next bytecode of the contract code starting with the first. In decision block 1302, if all the bytecodes have already been selected, then the component completes returning an indication that forbidden constructs were not found, else the component continues at block 1303. In decision blocks 1303-1305, the component determines whether the bytecode is a forbidden construct. If so, the component completes indicating that a forbidden construct was found. If not, the component loops to block 1301 to select the next bytecode of the contract code.

Figure 14:
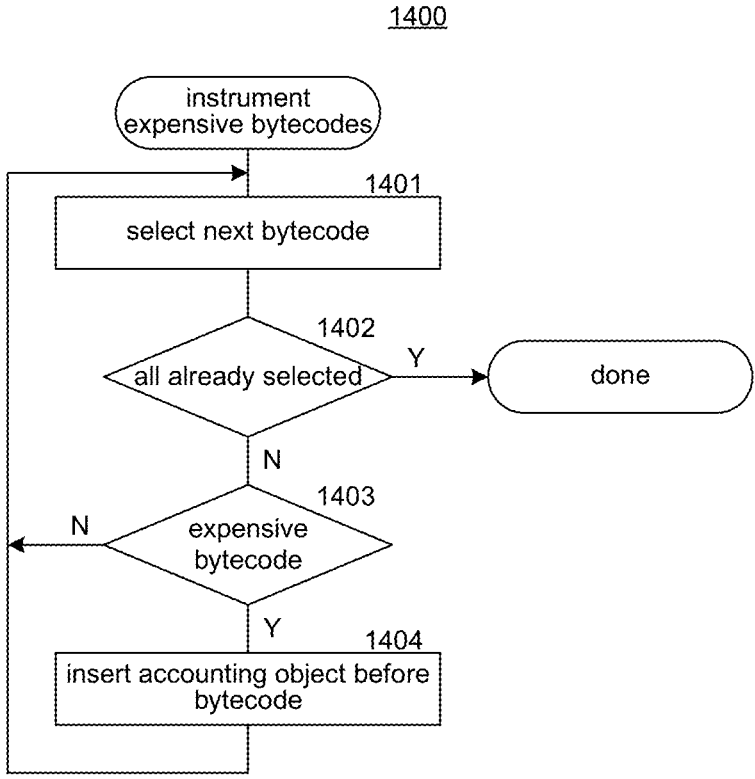
FIG. 14 is a flow diagram that illustrates processing of an instrument expensive bytecodes component in some embodiments.

FIG. 14 is a flow diagram that illustrates processing of an instrument expensive bytecodes component in some embodiments. An instrument expensive bytecodes component 1400 is invoked to determine whether bytecodes are expensive to instrument and if so, adds an accounting object before each such bytecode. The accounting object is responsible for terminating execution of the contract code if execution is taking too long or consuming too much memory. In a block 1401, the component selects the next bytecode of the contract code starting with the first. In decision block 1402, if all bytecodes have already been selected, then the component completes, else the component continues at block 1403. In decision block 1403, if the selected bytecode is expensive, then the component continues at block 1404, else the component loops to block 1402 to select the next bytecode. In block 1404, the component inserts an accounting object before the selected bytecode and then loops to block 1401 to select the next bytecode.

Figure 15:
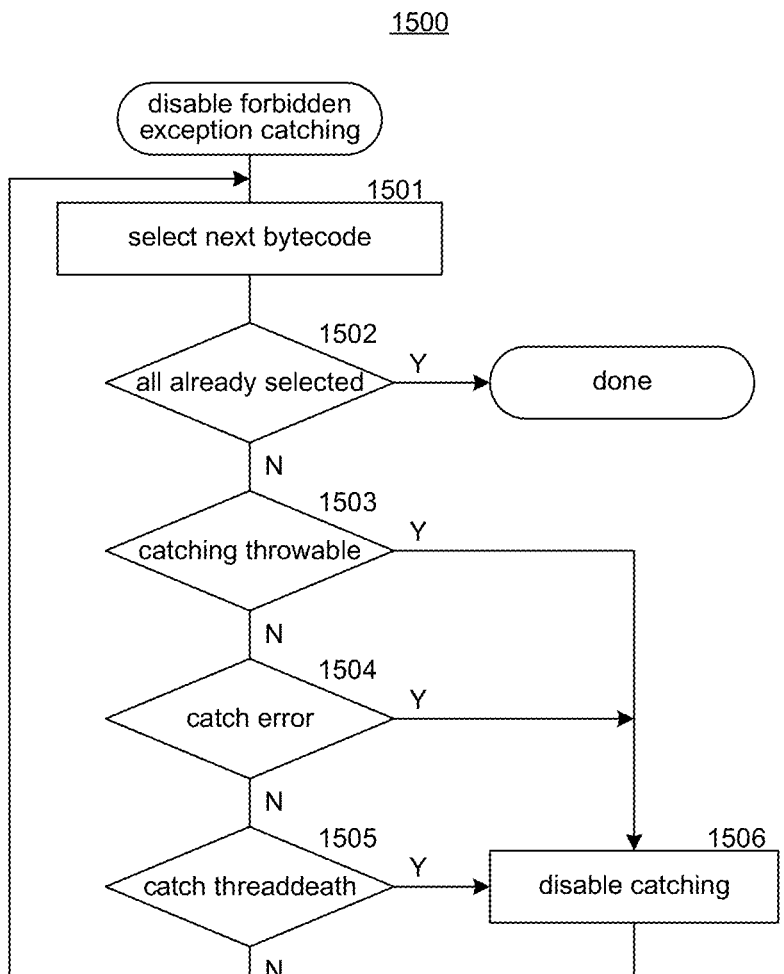
FIG. 15 is a flow diagram that illustrates processing of a disabled forbidden exception catching component in some embodiments.

FIG. 15 is a flow diagram that illustrates processing of a disable forbidden exception catching component in some embodiments. A disable forbidden exception catching component 1500 is invoked to ensure that the contract code does not catch certain exceptions. For example, an accounting object may want to terminate the thread on which the contract code is executing as a result of the contract code using an excessive amount of computational resources. In such a case, the accounting object may direct that an exception be thrown, which should not be handled by the contract code. In block 1501, the component selects the next bytecode of the contract code starting with the first. In decision block 1502, if all the bytecodes have already been selected, then the component returns, else the component continues at block 1503. In decision blocks 1503-1505, the component determines whether the bytecode represents the catching of a forbidden exception. If so, in block 1506, the component disables the catching of the exception and then loops to block 1501 to select the next bytecode. If not, the component loops to block 1501 to select the next bytecode.

Figure 16:
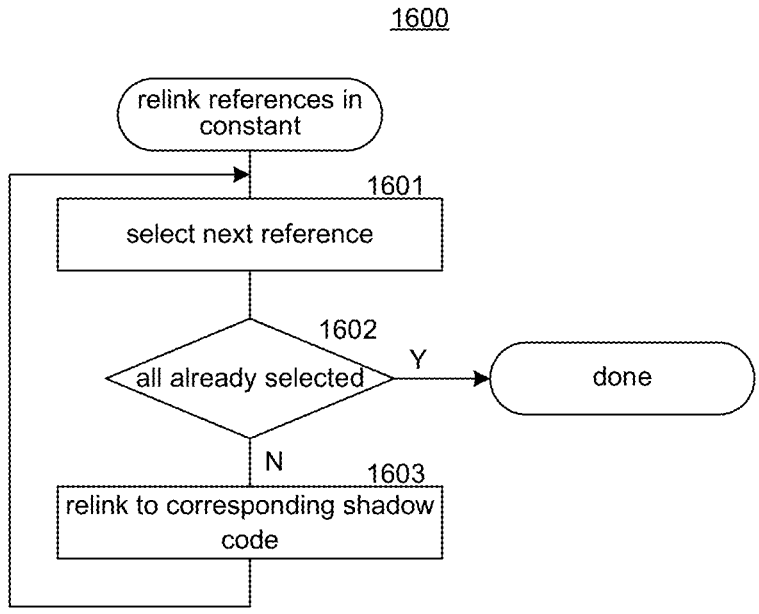
FIG. 16 is a flow diagram that illustrates processing of a relink references in constant pool component in some embodiments.

FIG. 16 is a flow diagram that illustrates processing of a relink references in constant pool component in some embodiments. A relink references constant pool component 1600 is invoked to relink the references to the shadow runtime library. In block 1601, the component selects the next reference in the constant pool. In decision block 1601, if all the references have already been selected, then the component completes, else the component continues at block 1603. In block 1603, the component relinks the reference to the corresponding shadow code in the shadow runtime library and then loops to block 1601 to select the next reference.

Figure 17:
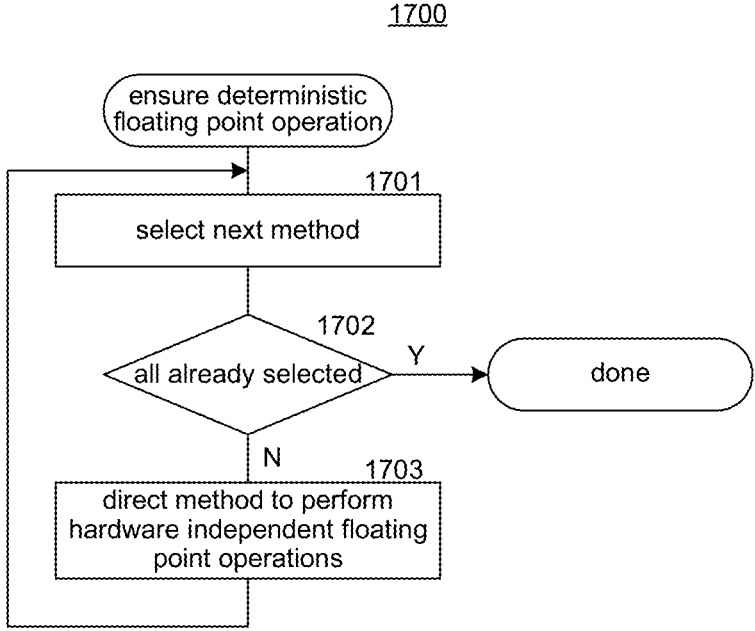
FIG. 17 is a flow diagram that illustrates processing of an ensure deterministic floating point operation component in some embodiments.

FIG. 17 is a flow diagram that illustrates processing of an ensure deterministic floating-point operation component in some embodiments. An ensure deterministic floating-point operations 1700 is invoked to direct each method to use hardware independent floating-point operations. In block 1701, the component selects the next method of the contract code. In decision block 1702, if all the methods have already been selected, then the component completes, else the component continues at block 1703. In block 1703, the component directs the method to perform hardware independent floating-point operations such as by setting the strictfp flag of a Java method and then loops to block 1701 to select the next method of the contract code.

Card Payments using Central Bank Digital Currencies

A central bank digital currency (CBDC) is a type of digital currency that is equivalent to a country's fiat currency. There are several ways that CBDC tokens can be transacted. In a fully intermediated model, for example, a retail bank fully controls CBDC tokens on behalf of its customers. These balances are represented in a CBDC-denominated account in the bank's regular core banking system. The bank has full control of the customers' tokens and can unilaterally spend them. Another example model replaces existing infrastructure, including payment cards and terminals, with custom infrastructure that is designed for CBDC transactions. For example, payment cards can be configured to directly store tokens and can be programmed with an identity enabling the cards to transact with the tokens in a network.

In a traditional payment card transaction, a user causes a payment card (sometimes called an "EMV card," named for Europay, Mastercard, and Visa—the three companies that developed a widely adopted technical standard for smart payment cards) to interface with a payment terminal. For example, the user swipes the payment card at the payment terminal or taps an RFID-enabled card to a terminal configured for contactless payments. A payment request is transmitted to a bank that issued the user's payment card. If the bank authorizes the payment, the bank transfers a requested amount of money to a bank holding the recipient's account. Such EMV payments have achieved worldwide adoption.

There would be less friction to use CBDC tokens—and thus wider adoption—if they could be used in a transaction that is close to a traditional payment card transaction, that does not require a significant overhaul of existing payment processing infrastructure but that gives customers control over their tokens. However, it is impractical to load CBDC tokens to a payment card, at least because the modifications to the widely adopted EMV cards and the network that processes them are prohibitive. For example, it is not feasible for tokens stored on a card to be transacted within a timeframe that would be acceptable to users accustomed to existing contactless payment systems.

Implementations described herein provide secure processing of card payments for transacting CBDC tokens. The systems and methods described herein enable a cardholder of a payment card, which may comply with the EMV standard, to authorize a payment of the cardholder's CBDC tokens by, for example, tapping the payment card at an RFID-enabled contactless payment terminal, swiping the payment card at a merchant terminal, inserting the card into a chip reader, providing payment information at an online point of sale, and the like. The merchant who receives the CBDC tokens is in turn able to use the tokens as currency, including by spending the tokens or by returning tokens to a customer in case of a refund.

Figure 18:
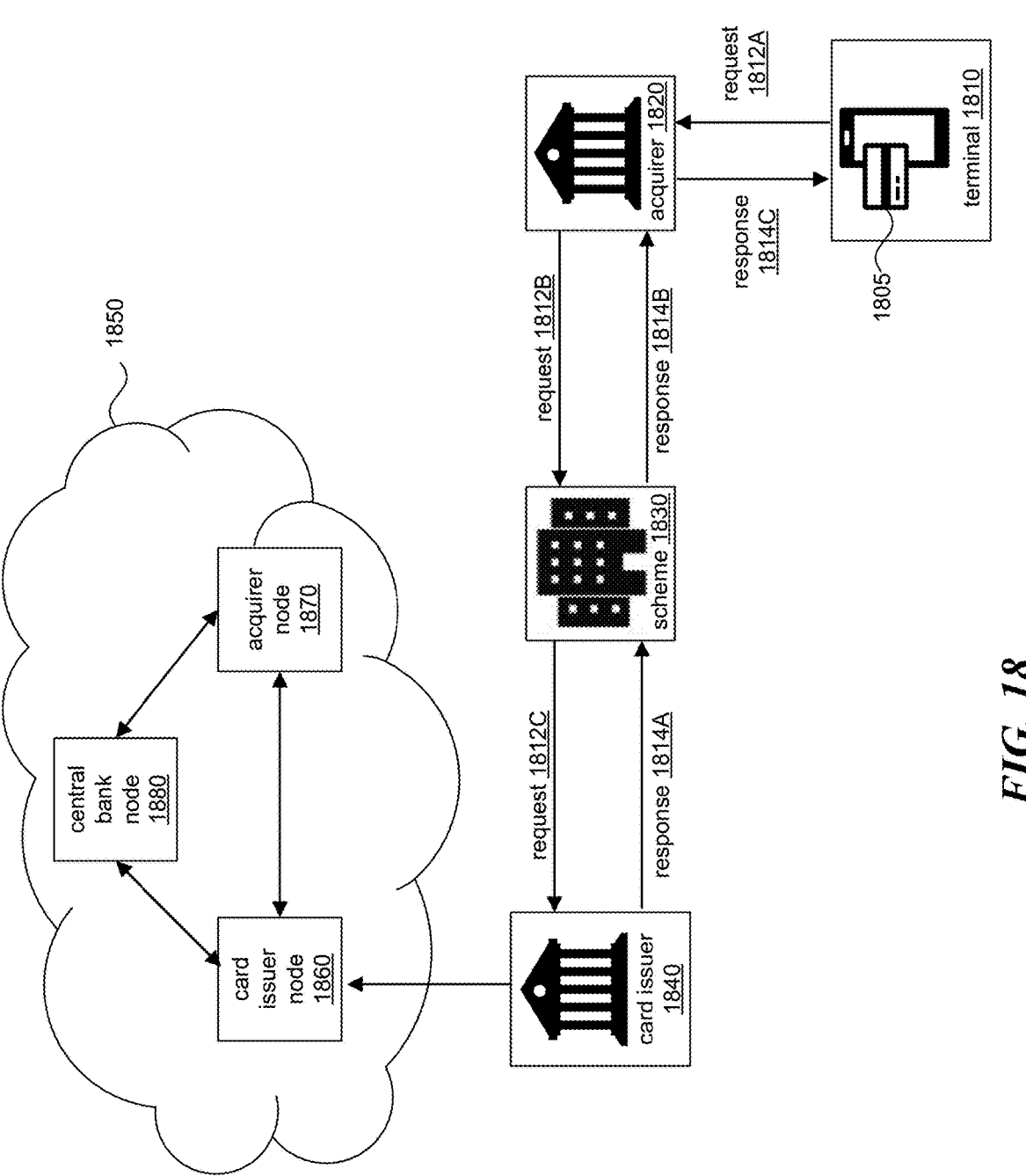
FIG. 18 illustrates an environment in which card payments with central bank digital currency (CBDC) tokens are facilitated, according to some implementations.

FIG. 18 illustrates an environment 1800 in which card payments with CBDC tokens are facilitated, according to some implementations, as well as an example transaction in the environment. As shown in FIG. 18, the environment 1800 can include an acquirer system 1820, a card processing scheme 1830, a card issuer system 1840, and a distributed computing environment 1850, according to some implementations.

When a cardholder of a CBDC-enabled card desires to conduct a transaction, the cardholder interfaces a payment card with a merchant terminal 1810 (e.g., by tapping an RFID-enabled card 1805 to a similarly equipped terminal). The merchant terminal 1810 generates a transaction request 1812A. The acquirer system 1820 and the card processing scheme 1830 pass the request as transaction requests 1812B and 1812C, respectively, to the card issuer 1840. Based on an authorization process, the card issuer 1840 returns a response 1814A to the scheme 1830, causing a response 1814B and response 1814C to be returned via the scheme 1830 and the acquirer system 1820 to the terminal 1810 to either approve or deny the transaction.

The merchant terminal 1810 is a computing device configured to communicate with an application on the payment card to generate the transaction request 1812. The merchant terminal 1810 can include a communications interface for communicating with the payment card, such as an RFID interface, a magnetic stripe reader, or an EMV chip reader. An application executed by the merchant terminal communicates with the card application based on communication between the card and the terminal to gather and generate data for constructing the transaction request 1812. The merchant terminal application further processes the response 1814 received from the card issuer 1840. For example, the merchant terminal application outputs information to indicate that payment was approved or denied, enabling the cardholder and the merchant to complete the transaction.

The acquirer system 1820 receives the transaction request 1812 from the merchant terminal 1810. Upon receiving the request, the acquirer system 1820, in at least some implementations, decrypts payment card data such as primary account number (PAN), track data, and expiration date of the card. The decrypted card data can be added to the transaction request 1812. The acquirer system 1820 can also use the PAN to identify a card issuer 1840 of the card, enabling the acquirer system 1820 to forward the transaction request 1812 to the appropriate issuer for processing.

Although FIG. 18 illustrates an example in which a transaction is initiated by a physical interface between a payment card and a merchant terminal, the transaction validation process described herein can be performed for other types of transactions. For example, a similar process can be used for transactions initiated at an online point of sale (e.g., a merchant's website).

The transaction request 1812 can be a message constructed according to ISO-8583. In an example, the terminal 1810 generates a request that includes the following information, encoded as an ISO-8583 compliant message:

Primary account number (associated with the payer's account) is provided in field 2 of the request;

Merchant identification (e.g., an identifier of the terminal 1810) is provided in field 41;

Payee account host node identity is provided in field 42;

Payment account is provided in field 4; and

Currency code is provided in field 49.

The payment card also transmits a signature to the terminal 1810, which is generated based on a private key stored on the card. The terminal 1810 encodes the signature in the transaction request 1812. For example, the signature is appended to data found in tag 9F10 of field 55 of an ISO-8583 message.

Transaction requests sent to the card issuer 1840 for approval are processed in a decentralized network environment 1850. In the decentralized environment 1850, a card issuer node 1860 (representing the card issuer 1840), an acquirer node 1870 (representing the acquirer 1820), and a central bank node 1880 interact to authorize and execute a transfer of a token from the card issuer to the acquirer. Each node 1860, 1870, 1880 maintains a ledger of transactions conducted in the decentralized environment.

According to some implementations, the card issuer node 1860 constructs a data structure for a requested transaction based on information contained in the transaction request 1812. For example, the card issuer node 1860 uses the primary account number in the request to retrieve a payer public key from a user account linked to the account number. The card issuer node also can use the merchant identification to retrieve a payee public key from an associated merchant account.

A token-based transaction typically requires a signature over it. Because the cardholder's private key resides on the payment card 1805, the card issuer node 1860 cannot sign the transaction with a signature based on the private key as it would for other types of token-based transactions. The transaction also cannot be directly signed by the payment card because the amount of data that would need to be conveyed from the card to the decentralized environment 1850 would exceed the amount of data permitted by the EMV standard. Thus, according to some implementations herein, the card issuer node 1860 considers a signature sent in the request from the card to be an "off-node" signing whose presence in the transaction is proof the cardholder authorized the payment the node. To represent this signature in the transaction, the card issuer node 1860 generates a signature data structure that functions as proof that the cardholder authorized payment without needing to modify the payment card to enable it to directly sign a transaction. The signature data structure for the transaction represents the cardholder's intent to pay a certain amount of currency from the cardholder's account to the merchant's account, and can thereby be used in lieu of a traditional signature to the transaction. The signature data structure includes or represents the signature transmitted from the payment card, and can also encode information about the transaction as requested at the payment terminal. For example, the signature data structure can include or represent information such as currency, amount, payer identity, or payee identity.

The card issuer node 1860 attaches the signature data structure to a transaction. The transaction with attached signature data can be transmitted to a notary for verification. In some implementations, the signature data structure is issued on the ledgers of the applicable nodes as an input state to the transaction. As described above, a transaction in which CBDC tokens are transferred from one account to another includes the following information:

at least one input state representing the signature data structure and unspent tokens linked to a first user, for example via a public key of the first user (a payer public key) or a private key of the first user (a payer private key);

one or more output states representing spent tokens, which are linked to a second user, for example via a public key of the second user (a payee public key) or a private key of the second user (a payee private key);

zero or more output states representing unspent tokens linked to the payer private key, which are returned to the payer as change when the total value of the tokens selected for use in a transaction is greater than the payment amount requested in the transaction;

a command instructing a validator which signatures are to be applied to the transaction; and contract code instructing the validator when a transaction is valid. This contract code can include instructions that identify the transaction as a card-based token transaction, causing the validator to validate the transaction according to the rules of a card-based transaction rather than rules of other types of token transactions.

In an example, the signature data structure is created by the card issuer node 1840 as a state with the following definition:

data class EMVAuthorisationState(val issuer: Party, val signatureBytes: ByteArray): ContractState in which the signature is stored in the signatureBytes field. The EMVAutorisationState can be an output state of a deterministic transaction.

The transaction can also include public keys of the payer and payee that form respective public key/private key pairs with the payer private key and payee private key. Alternatively, the public keys can be provided to the central bank node 1880 independently of the transaction, such as prior to the time of the transaction.

For the transaction to be approved, the value of the unspent tokens must be greater than or equal to the desired payment amount. The contract code specified in the transaction may require the validator to determine that the signatures to the transaction match the signatures required by the command, the amount being spent by the payer is equal to the amount received by the payee, and/or that the spent tokens have a specified currency type.

Each transaction also includes a transaction identifier. In some implementations, the transaction identifier is based on a hash value of the above components of the transaction. The components of the transaction can be recorded on the applicable ledgers in association with the transaction identifier.

To increase security of card transactions and reduce the ability of the card issuer node 1860 to use the same card signature for multiple—potentially unauthorized—transactions, the card issuer node 1860 issues the signature as a unique state on a ledger in some implementations, where this unique state is consumed as part of the payment transaction. Uniqueness of the signature state can be ensured by enforcing uniqueness of the transaction identifier of the transaction issuing the state. Thus, when generating the transaction data structure, some implementations of the card issuer node 1860 generates a transaction identifier by computing a hash value of the components of the transaction and applying a specified privacy salt to the hash value. The card issuer node

1860 can be configured to add the component values to a transaction in a specified order, such that the transaction can be reconstructed to validate the transaction identifier.

The central bank node 1880 represents a bank or issuer of tokens, which is a custodian of CBDC tokens for multiple cardholder accounts. In at least some implementations, the bank or issuer cannot redeem or move tokens without authorization of the corresponding cardholder.

A validation of a transaction can be performed by an entity, such as a notary, prior to the transaction being recorded on a distributed ledger. In some implementations, upon receiving a transaction from the card issuer node 1860, the notary executes a verification function to validate a transaction based on the transaction data structure. A successful verification indicates that the transaction does indeed match the payment intent of the cardholder at the moment of interfacing the card with the terminal 1810, and thus that a requested amount of tokens can be moved to the acquirer.

The verification function employed by the notary receives contract code specifying the criteria that must be satisfied for the requested transaction to be verified. To validate a transaction, the contract code causes the notary to check transaction information against the cardholder's intent by verifying the card signature from the request message using the private key associated with the spent tokens, as well as the data structure constructed by the card issuer node 1860. In particular, the contract code can cause the notary to ensure that the signature data structure contains a signature generated using the private key of the current owner of a token to be transacted. For example, the notary uses a public key associated with the current owner (provided in the transaction) to verify that the signature in the signature data structure was generated using the corresponding private key. The contract code further causes the notary to validate properties of the transaction such as currency, amount, payer identity, or payee identity. For example, the notary verifies that all token input states are owned by the payer and that spent tokens are owned by the payee (e.g., by verifying that a signature received from the payment terminal can be validated using a known public key of the payee). The notary can also verify that the token type matches the currency and the spent amount matches the payment amount authorized at the payment terminal. The notary can include other functions as described above.

In some implementations, the notary also validates the transaction identifier of a transaction in order to verify that the signature data structure is associated with the correct transaction (and thus that the cardholder authorized the transaction). For example, the notary recreates the transaction with expected inputs and outputs and any privacy salt applied by the card issuer node 1860, verifying that the recreated transaction has the same identifier as the requested transaction.

Once a transaction has been validated, the notary conveys the validation to each of the applicable nodes (e.g., the card issuer node 1860 and the acquirer node 1870). Each node updates its ledger accordingly.

Figure 19:
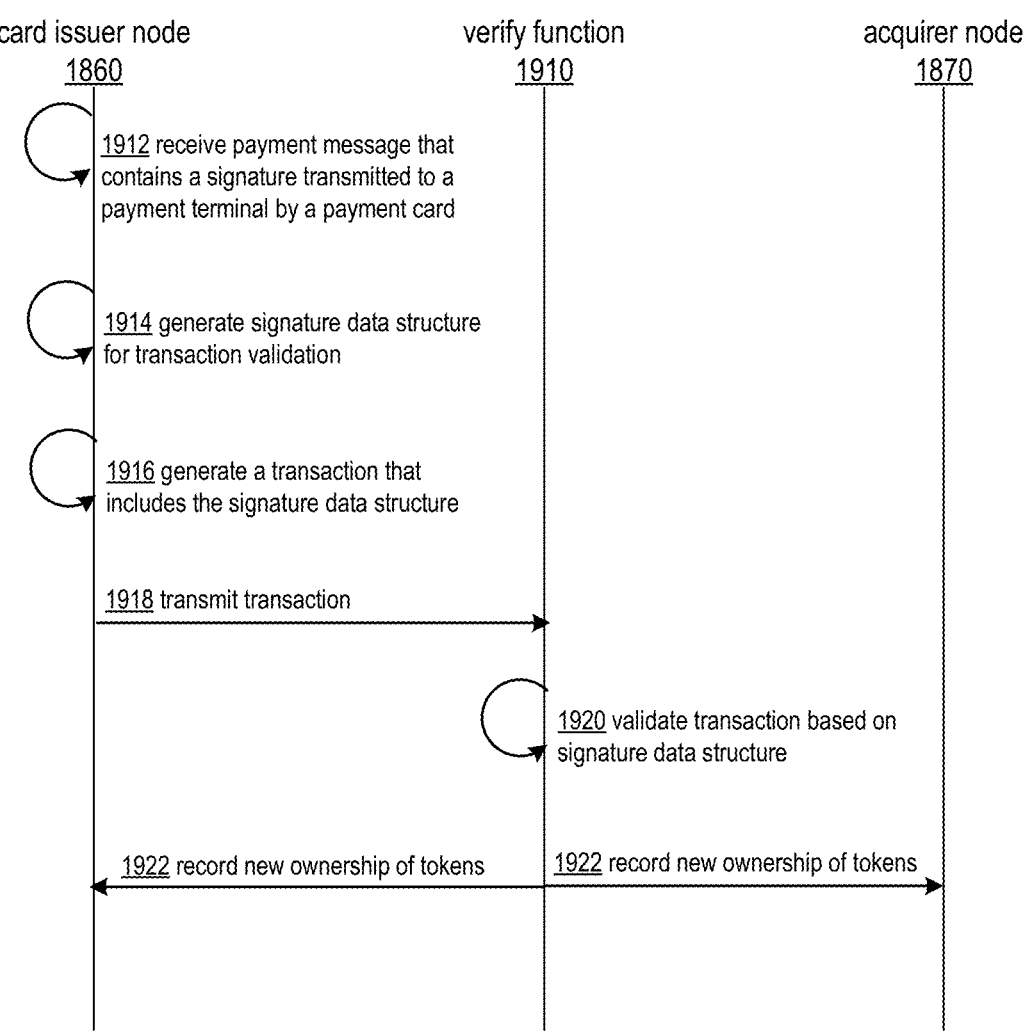
FIG. 19 is an interaction diagram illustrating a process for validating card-based CBDC transactions, according to some implementations.

FIG. 19 is an interaction diagram illustrating a process 1900 for validating card-based CBDC transactions, according to some implementations. As shown in FIG. 19, the process 1900 can include interactions between the card issuer node 1860 in the decentralized environment 1850, the acquirer node 1870, and a verification function 1910, which for example can be executed by a third-party notary.

At 1912, the card issuer node 1860 receives a payment message from a payment terminal. The payment message is a request to conduct a transaction in which one or more CBDC tokens are to be transferred from a payer account to a payee account. The payment message contains a signature transmitted to the payment terminal by a payment card associated with a payer account.

At 1914, the card issuer node 1860 generates a signature data structure containing the signature that is to be used for validation of the transaction. In addition to the signature, the signature data structure can contain information about the transaction as indicated in the payment message received from the payment terminal.

At 1916, the card issuer node 1860 generates a transaction that includes the signature data structure. The transaction also can include input states representing unspent tokens held by a payer, output states representing spent tokens held by a payee and/or unspent tokens returned to the payer, and validation instructions for use by the verification function 1910 when validating the transaction. The transaction is transmitted to the verification function 1910 at 1918.

At 1920, the verification function 1910 executes contract code, using the validation instructions, to validate the transaction. Validation of the transaction can be based at least in part on the signature data structure. For example, the verification function 1910 can verify that signature in the data structure was generated using the private key of the payer, as well as that transaction details in the signature data structure match the properties of the underlying transaction.

If the transaction is validated, the verification function 1910 transmits, at 1922, confirmation of the validation to the card issuer node 1860 and the acquirer node 1870 to cause the respective nodes to record the acquirer node's ownership of the transferred tokens in the ledger maintained by each node. The transaction and the associated signature data structure are marked as consumed on each ledger.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A method for conducting a transaction using a central bank digital currency (CBDC), the method comprising:
   receiving, at a card issuer node in a distributed ledger environment, from a payment terminal, a payment message,
   wherein the payment message contains a signature transmitted to the payment terminal by a payment card,
   wherein the payment message contains a terminal signature of the payment terminal,
   wherein the payment message contains an acquirer identity,
   wherein the payment message comprises a request to conduct the transaction, and
   wherein the payment card is associated with a payer account that holds one or more tokens of a CBDC, the one or more tokens to be transferred in the transaction from the payer account to a payee account;
   accessing, by the card issuer node, a payee public key associated with an acquirer associated with the acquirer identity;
   generating, by the card issuer node, a signature data structure containing a representation of the signature,
   wherein the signature data structure is generated as a unique state on a ledger of the distributed ledger environment, and
   wherein the unique state is consumed as part of the transaction; and
   generating, by the card issuer node, a transaction message that includes the signature data structure,
   wherein the transaction is validated based on the signature data structure and verifying the terminal signature using the payee public key.

2. The method of claim 1, further comprising:
   upon receiving, at the card issuer node, an indication that the transaction is validated, returning a response to the payment terminal to authorize the transaction.

3. The method of claim 1, wherein the signature is based on a private key of a public key/private key pair stored on the payment card, and wherein validating the transaction based on the signature data structure comprises verifying that the signature data structure contains a signature that matches a private key associated with a current owner of the one or more tokens to be transferred in the transaction.

4. The method of claim 3, wherein the payment message further contains a primary account number, and wherein the method further comprises:
   retrieving, by the card issuer node, a public key associated with the payer account using the primary account number;
   wherein generating the transaction message further comprises adding the public key associated with the payer account to the transaction message; and
   wherein verifying that the signature data structure contains the signature that matches the private key associated with the current owner comprises verifying the signature using the public key associated with the payer account.

5. The method of claim 1:

wherein generating the transaction message comprises assigning a transaction identifier to the transaction; and wherein the signature data structure is issued, on a ledger used to record details of the transaction, as an input state to the transaction associated with the transaction identifier.

6. The method of claim 5, wherein assigning the transaction identifier comprises:

generating a unique, deterministic value for the transaction identifier.

7. The method of claim 6, wherein generating the unique, deterministic value for the transaction identifier comprises:

generating a hash value representing components of the transaction message; and applying a constant privacy salt to the hash value.

8. The method of claim 5, wherein validation of the transaction is based on reconstruction of the transaction message by a verification function and verification that an identifier of the reconstructed transaction message matches the transaction identifier of the transaction.

9. The method of claim 1, wherein the terminal signature is generated using a private key stored in the payment terminal.

10. The method of claim 1, wherein the payment message further contains a payment amount, and wherein validation of the transaction is based in part on a determination that the payment amount is less than a value of the one or more tokens held in the payer account.

11. The method of claim 1, wherein the payment card is a Europay-Mastercard-Visa (EMV) card, and wherein the payment message is an ISO-8583 message.

12. The method of claim 11, wherein the signature is appended to data in tag 9F10 of field 55 of the ISO-8583 message.

13. A system for conducting a transaction using a central bank digital currency (CBDC), the system comprising:

at least one hardware processor; and at least one non-transitory memory storing instructions, which, when executed by the at least one hardware processor, cause the system to:

receive, from a payment terminal, a payment message, wherein the payment message contains a signature transmitted to the payment terminal by a payment card, wherein the payment message contains a terminal signature of the payment terminal, wherein the payment message contains an acquirer identity, wherein the payment message comprises a request to conduct the transaction, and wherein the payment card is associated with a payer account that holds one or more tokens of a CBDC, the one or more tokens to be transferred in the transaction from the payer account to a payee account;

access a payee public key associated with an acquirer associated with the acquirer identity;

generate a signature data structure containing a representation of the signature, wherein the signature data structure is generated as a unique state on a ledger of a distributed ledger environment, and wherein the unique data state is consumed as part of the transaction; and generate a transaction message that includes the signature data structure, wherein the transaction is validated based on the signature data structure and verifying the terminal signature using the payee public key.

14. The system of claim 13, wherein the signature is based on a private key of a public key/private key pair stored on the payment card, and wherein validating the transaction based on the signature data structure comprises verifying that the signature data structure contains a signature that matches a private key associated with a current owner of the one or more tokens to be transferred in the transaction.

15. The system of claim 14:

wherein generating the transaction message comprises assigning a transaction identifier to the transaction; and wherein the signature data structure is issued, on a ledger used to record details of the transaction, as an input state to the transaction associated with the transaction identifier.

16. The system of claim 15, wherein the payment message further contains a primary account number, and wherein execution of the instructions further causes the system to:

retrieve a public key associated with the payer account using the primary account number, wherein generating the transaction message further comprises adding the public key associated with the payer account to the transaction message, and wherein verifying that the signature data structure contains the signature that matches the private key associated with the current owner comprises verifying the signature using the public key associated with the payer account.

17. A non-transitory, computer-readable storage medium comprising instructions recorded thereon that, when executed by at least one processor of a system, cause the system to:

receive, from a payment terminal, a payment message, wherein the payment message that contains a signature transmitted to the payment terminal by a payment card, wherein the payment message contains a terminal signature of the payment terminal, wherein the payment message contains an acquirer identity, wherein the payment message comprises a request to conduct a transaction, and wherein the payment card is associated with a payer account that holds one or more tokens of a central bank digital currency (CBDC), the one or more tokens to be transferred as part of the transaction from the payer account to a payee account;

access a payee public key associated with an acquirer associated with the acquirer identity;

generate a signature data structure containing a representation of the signature, wherein the signature data structure is generated as a unique state on a ledger of a distributed ledger environment, and wherein the unique state is consumed as part of the transaction; and generate a transaction message that includes the signature data structure, wherein the transaction is validated based on the signature data structure and verifying the terminal signature using the payee public key.

18. The non-transitory computer-readable storage medium of claim 17, wherein the signature is based on a private key of a public key/private key pair stored on the payment card, and wherein validating the transaction based on the signature data structure comprises verifying that the signature data structure contains a signature that matches a private key associated with a current owner of the one or more tokens to be transferred in the transaction.

19. The non-transitory computer-readable storage medium of claim 18:

wherein generating the transaction message comprises assigning a transaction identifier to the transaction; and wherein the signature data structure is issued, on a ledger used to record details of the transaction, as an input state to the transaction associated with the transaction identifier.

20. The non-transitory computer-readable storage medium of claim 19, wherein the payment message further contains a primary account number, and wherein execution of the instructions further causes the system to:

retrieve a public key associated with the payer account using the primary account number, wherein generating the transaction message further comprises adding the public key associated with the payer account to the transaction message, and wherein verifying that the signature data structure contains the signature that matches a private key associated with the current owner comprises verifying the signature using the public key associated with the payer account.

* * * * *